(12) United States Patent
Kissa et al.

(10) Patent No.: US 8,849,071 B2
(45) Date of Patent: Sep. 30, 2014

(54) OPTICAL WAVEGUIDE MODULATOR

(75) Inventors: Karl Kissa, West Simsbury, CT (US);
Gregory J. McBrien, Glastonbury, CT (US)

(73) Assignee: JDS Uniphase Corporation, Milpitas, CA (US)

(*) Notice: Subject to any disclaimer, the term of this patent is extended or adjusted under 35 U.S.C. 154(b) by 317 days.

(21) Appl. No.: 12/981,307

(22) Filed: Dec. 29, 2010

(65) Prior Publication Data

US 2011/0158576 A1 Jun. 30, 2011

Related U.S. Application Data

(60) Provisional application No. 61/291,252, filed on Dec. 30, 2009.

(51) Int. Cl.
*G02F 1/035* (2006.01)

(52) U.S. Cl.
USPC ............................................. 385/3; 385/50

(58) Field of Classification Search
USPC ........................................................ 385/3, 50
See application file for complete search history.

(56) References Cited

U.S. PATENT DOCUMENTS

| | | | | |
|---|---|---|---|---|
| 5,031,235 A | | 7/1991 | Raskin et al. | 398/66 |
| 5,101,450 A | * | 3/1992 | Olshansky | 385/3 |
| 5,148,503 A | | 9/1992 | Skeie | 385/3 |
| 5,161,206 A | * | 11/1992 | Djupsjobacka | 385/2 |
| 5,249,243 A | * | 9/1993 | Skeie | 385/3 |
| 5,278,923 A | * | 1/1994 | Nazarathy et al. | 385/3 |
| 5,278,924 A | * | 1/1994 | Schaffner | 385/3 |
| 5,393,371 A | * | 2/1995 | Chang et al. | 216/24 |
| 5,710,653 A | * | 1/1998 | Nemecek et al. | 398/194 |
| 5,835,212 A | * | 11/1998 | Kissa et al. | 356/477 |
| 5,875,048 A | * | 2/1999 | Nemecek et al. | 398/194 |
| 5,891,747 A | * | 4/1999 | Farah | 438/31 |
| 5,999,292 A | * | 12/1999 | Dennis et al. | 398/101 |
| 6,091,864 A | * | 7/2000 | Hofmeister | 385/2 |
| 6,163,395 A | * | 12/2000 | Nemecek et al. | 398/198 |
| 6,501,867 B2 | | 12/2002 | Gates, II et al. | 385/2 |
| 6,943,931 B1 | * | 9/2005 | Dingel | 359/279 |
| 7,058,241 B2 | | 6/2006 | Sugiyama et al. | 385/4 |
| 7,095,543 B1 | * | 8/2006 | Hill et al. | 359/254 |

(Continued)

OTHER PUBLICATIONS

S.K. Korotky and R.M. Ridder, "Dual parallel modulation schemes for low-distortion analog optical transmission," IEEE Journal on Selected Areas in Communications, vol. 8, No. 7, Sep. 1990, pp. 1377-1381.

(Continued)

*Primary Examiner* — Kaveh Kianni
(74) *Attorney, Agent, or Firm* — Matthew A. Pequignot; Pequignot + Myers

(57) ABSTRACT

The invention relates to waveguide optical modulators wherein two or more waveguides are modulated with specific modulation strengths using a single straight signal electrode or a single multi-segment signal electrode. Modulation strengths for each of a plurality of waveguides modulated by a single multi-segment electrode are matched over a wide modulation frequency range. Linearized output characteristics with respect to second and third order distortions are achieved in one aspect of the invention.

14 Claims, 32 Drawing Sheets

(56) References Cited

U.S. PATENT DOCUMENTS

| | | | |
|---|---|---|---|
| 7,400,787 B2 | 7/2008 | Burns | 385/3 |
| 8,320,720 B2* | 11/2012 | Webster et al. | 385/14 |
| 2002/0003641 A1* | 1/2002 | Hall et al. | 359/122 |
| 2003/0063364 A1* | 4/2003 | Kambe | 359/245 |
| 2009/0065478 A1* | 3/2009 | Dockery et al. | 216/60 |
| 2009/0093982 A1* | 4/2009 | Kissa et al. | 702/97 |
| 2009/0129719 A1* | 5/2009 | Rowinski et al. | 385/2 |
| 2009/0185810 A1* | 7/2009 | Kaplan et al. | 398/184 |
| 2009/0202198 A1* | 8/2009 | Sugiyama | 385/14 |
| 2009/0304393 A1* | 12/2009 | Kawanishi et al. | 398/187 |
| 2010/0027023 A1* | 2/2010 | Sanders | 356/477 |
| 2011/0044573 A1* | 2/2011 | Webster et al. | 385/3 |
| 2011/0229070 A1* | 9/2011 | Doi et al. | 385/3 |

OTHER PUBLICATIONS

G.E. Betts, "A linearized modulator for high performance bandpass optical analog links," IEEE Microwave Symposium Digest, vol. 2, May 23-27, 1994, pp. 1097-1100.

L.M. Johnson and H.V. Roussell, "Linearization of an interferometric modulator at microwave frequencies by polarization mixing," IEEE Photonics Technology Letters, vol. 2, No. 11, Nov. 1990, pp. 810-811.

K. Noguchi, et. al., "Millimeter-wave Ti:LiNbO$_3$ optical modulators," IEEE Journal of Lightwave Technology, vol. 16, No. 4, Apr. 1998, pp. 615-619.

F. Devaux, et. al., "Simple measurement of fiber dispersion and of chirp parameter of intensity modulated light emitter," *IEEE Journal of Lightwave Technology*, vol. 11, No. 12, Dec. 1993, pp. 1937-1940.

\* cited by examiner

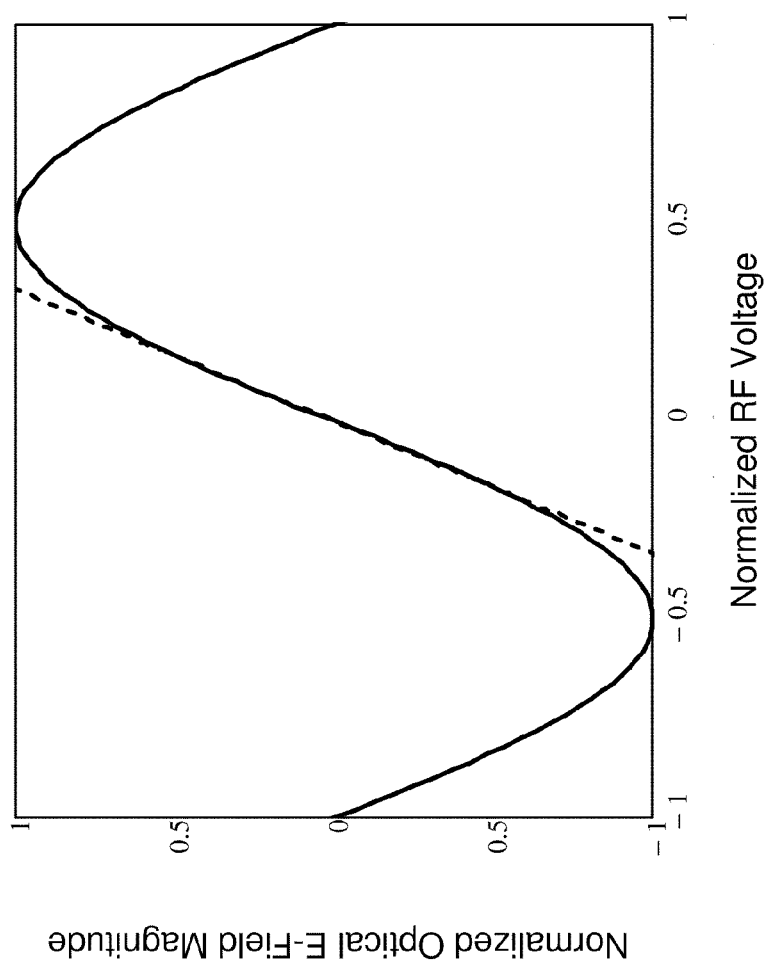
Fig. 22 (a) (Prior Art)

OPTICAL WAVEGUIDE MODULATOR

CROSS-REFERENCE TO RELATED APPLICATIONS

The present invention claims priority from U.S. Provisional Patent Application No. 61/291,252 filed Dec. 30, 2009, which is incorporated herein by reference. It is related to U.S. patent application Ser. No. 12/241,570 filed Sep. 30, 2008 and entitled "External Optical Modulator With Domain Inversion For Providing Constant Chirp Versus Frequency", which claims priority from U.S. Provisional Patent Application No. 60/977,183 filed Oct. 3, 2007, both of which are incorporated herein by reference.

TECHNICAL FIELD

The present invention generally relates to optical waveguide modulators, and more particularly relates to linearized microwave optical waveguide modulators with a single RF signal electrode in at least a one modulation section thereof.

BACKGROUND OF THE INVENTION

Waveguide optical modulators are well known in the art and are used in a variety of applications. For high bandwidth application, for example at modulation rates in the 5 GHz to 40 GHz range, such modulators typically are based on electro-optical materials incorporating voltage-controlled waveguides forming a Mach-Zehnder interferometer structure, which enables to convert phase modulation of light propagating in the waveguides into an optical power modulation of a combined light at the output of the Mach-Zehnder structure. Such modulators are conventionally referred to as Mach-Zehnder (MZ) modulators.

One disadvantage of conventional voltage-controlled MZ structures is that its transmission characteristic, i.e. the dependence of an output optical power on the applied voltage, is substantially nonlinear, and is generally in the form of a sinusoid. This non-linear MZ transmission characteristic of the MZ interferometer (MZI) structure results in non-linear distortions of the modulation of the output optical signal in conventional MZ modulators. For example, if the voltage applied to the electrodes of a conventional MZ modulator has a modulation component at a frequency J and the modulator is optically fed with cw light, the output optical power from the modulator may include not only a modulation components at the modulation frequency f, but also modulation components at harmonics of the modulation frequency 2f, 3f, etc, which are referred to as, respectively, the second order distortion, the third order distortion, etc, which result from the appearance of products of the modulation components of different orders in the output signal due to the nonlinearity. The second order distortions are also referred to as CSO (Composite Second Order) distortions or CSO distortion products, while the third order distortions are also referred to as CTB (Composite Triple Beat) distortions or CTB distortion products. These distortion products are problematic for systems that transmit analog signals or multi-level digital signals that are analog in nature, such as Quadrature Amplitude Modulation (QAM) signals of various formats. In applications where the useful signal is in the modulation of the electrical field E of the output optical wave rather than in that of the optical power, such as for the transmission of QAM signals, the $1^{st}$ and $2^{nd}$ order distortions may relate to respective harmonics in the modulation of the electrical field E, which is proportional to a square root of the optical power P.

Various approaches to reducing non-linear distortions in MZ modulators have been disclosed in the art. U.S. Pat. No. 5,161,206 discloses an x-cut microwave linearized modulator (LINMOD) 10 using a parallel topology that is illustrated in FIG. 1. The modulator is formed of two inner MZ modulators 5, 6 coupled in parallel between an input optical coupler 2 followed by two Y-junction splitters 4, and three Y-junction combiners 18, 19 at the output. Each of the inner MZ modulators 5, 6 has an RF signal electrode 11, 12 and one ground electrode 15, with another ground electrode being shared between the MZ modulators. Biasing electrodes are provided for biasing the inner MZI's 5, 6 to quadrature operating points, i.e. the half-power point in the transmission curve, which eliminates $2^{nd}$ order (CSO) frequency components in the received signal.

In operation, an applied electrical RF signal is split into two signals, V_RF1_in and VRF2_in, having the same phase but different amplitudes, which are separately applied to the signal electrodes 11, 12 for driving respective inner MZ modulators 5, 6. The ratio of the amplitudes of the RE signals is given by the parameter $A_{RF}$ according to Equation 1, where $A_{RF}$ is typically a value less than 1.

$$A_{RF} = \frac{V_{RF2}}{V_{RF1}} \quad (1)$$

The output of the modulator 10 is linearized with respect to $3^{rd}$ order distortions, i.e. the CTB, by adjusting a coupling ratio of the coupler 2, defined by the fraction of light in the coupler that stays within the same waveguide receiving input light, and/or the RF signal split ratio $A_{RF}$. An optimum value of the coupler coupling ratio $R_{cplr}$ for the linearization is given by equation (2):

$$R_{cplr} = \frac{A_{RF}^3}{1 + A_{RF}^3} \quad (2)$$

For example, $A_{RF}$ equal to 0.6 implies that $R_{cplr}$ must equal 0.178. FIG. 2 shows a plot of normalized optical output power vs. normalized RF voltage at the input to the electrodes for the device shown in FIG. 1. In this figure, the vertical coordinate represents the optical output power from the modulator 10 normalized to the total optical output power available from all optical output ports. The horizontal coordinate represents the RF voltage normalized to a voltage $V_\pi$ that results in a $\pi$ phase shift in the inner MZI having the larger RF signal. This plot is also called a transfer curve for the device.

The RF power ratio $A_{RF}$ of the RF signals must be carefully tuned to obtain an optimum suppression of the third order (CTB) frequency components in the output signal. It must be preserved at all frequencies, hence the frequency response as defined by an electrical-optical-electrical (e-o-e) forward transmission coefficient, or forward (voltage) gain $S_{21}$ of the two inner MZI structures 5, 6 must be matched to within approximately 0.2 dB. Having a single tunable coupler 2 that is tuned to satisfy Equation 2 makes the design robust to variations in γ that may occur due to fabrication variations in the electrode and waveguides structures.

One disadvantage of the parallel LINMOD 10 is the loss of about half of the optical power due to the coupler having a coupling ratio that does not match the split ratio of the y-junction combiner near the output of the device.

FIG. 3 shows a linearized modulator 20, described in U.S. Pat. No. 5,148,503, which is incorporated herein by reference; it can be viewed as a serial version of the linearized modulator 10. Two conventional MZ modulators 21, 22 are cascaded in a serial fashion with a first coupler 24 therebetween, and an output coupler 26. As before, the $S_{21}$ (e-o-e) frequency responses must be carefully matched to within tenths of dB. The serial LINMOD 20 has unequal splits in the coupler 24 or 26, but does not result in any appreciable amount of lost power, as can be seen in the transfer curve plot shown in FIG. 4. The conventional MZI structures 21, 22 are biased such that the LINMOD 20 outputs are at the quadrature (half-power) point without any RF applied. As with the parallel LINMOD 10, both CSO and CTB distortion products are suppressed if the ratio γ of the modulating voltages for the two modulators is suitably selected.

An optimum value of a ratio between the amplitudes of RF signals applied to the signal electrodes 23 and 24 of the MZ modulators 21 and 22, R=V_RF2_in/V_RF1_in, is given by a real root to Equation 3 hereinbelow. The variables $\gamma_1$ and $\gamma_2$ relate to the coupling ratios $R_{cplr1}$ and $R_{cplr2}$ for the couplers 24 and 25, respectively in FIG. 3, as defined by equations 4 and 5. The coupling ratios are defined as the fraction of light that remains within a waveguide after passing through the coupling region of the coupler.

$$R^3+3\cos(2\gamma_1)R^2+3R+[\sin(2\gamma_1)\cot(2\gamma_2)+\cos(2\gamma_1)]=0 \quad (3)$$

$$\cos^2(\gamma_1)=R_{cplr1} \quad (4)$$

$$\cos^2(\gamma_2)=R_{cplr2} \quad (5)$$

One major problem with the prior art linearized modulators 10, 20 is the need for two separate, but identical RF electrodes being driven by outputs of an RF splitter. Typically the two RF electrodes are slightly different due to variation in the fabrication process across the device. In addition, separate cables and/or RE traces that route the RF signals to each of the signal electrodes may be slightly different in attenuation or length, causing differences in frequency response and/or phase response due to timing skew. Any RF reflections that are not exactly matched will also result in ripple in the frequency response that is different for the two RF electrodes. In practice, these difficulties can be overcome for modulation frequencies of less than 5 GHz, but become very difficult at frequencies approaching or above 20 GHz.

FIG. 5 shows another modulator topology for suppressing CTB frequency components described in G. E. Betts, "A linearized modulator for high performance bandpass optical analog links," IEEE Microwave Symposium Digest, Vol. 2, May 23-27, 1994, pp. 1097-1100, which is incorporated herein by reference. The LINMOD 30 illustrated in FIG. 5 may be referred to as a carrier suppressed modulator, as the DC component of light is suppressed at the modulator output. In this modulator, a single MZI structure 33 with single RF electrode 31 is nested within a larger MZI structure 35. A coupler 36 can be either at the input or output of the LINMOD 30, or both. DC bias voltages are applied to bias electrodes 37, 38 shown in the drawing. FIG. 6 shows the transfer curve for the modulator shown in FIG. 5. Unlike other LINMODs 10 and 20 described hereinabove, this device is not biased to the half power point. The outer arm 39 of the outer MZI 35 is biased so that both arms of the outer MZI 35 have the same phase or 180 degrees out of phase, when the inner MZI 33 is fully on, i.e. is at a point of maximum transmission. The inner MZI 33 is biased at the point where the waveguide arms thereof have about 0.9 π phase difference between them. This bias point is shown in FIG. 6 indicated by an arrow. The DC component of light at the output of the device is only about 8% of the input power for an idealized lossless modulator. The relative amount of DC light relative to the slope of the transfer curve at the bias point, which defines the AC component of the output light, is only ½ that of an ordinary MZ, which helps to reduce noise at the receiver.

The device in FIG. 5 has the advantage of requiring only a single RF electrode. A major disadvantage of the LINMOD 30 for some applications is that the CSO components are not suppressed; in fact those components have about the same amplitude as the fundamental frequency components. This device may not be suitable for multi-octave systems, where CSO suppression is required.

FIG. 7 shows a prior art LINMOD 40 using two polarizations within a single conventional MZI 41 made in lithium niobate (LN), as disclosed in L. M. Johnson and H. V. Roussell, "Linearization of an interferometric modulator at microwave frequencies by polarization mixing," IEEE Photonics Technology Letters, Vol. 2, No. 11, November 1990, pp. 810-811, which is incorporated herein by reference. The LINMOD 40 has a single signal electrode 45, two ground electrodes 43, and a bias electrode structure 44. Light having both orthogonal polarizations is introduced at the input of the device, however, most of the light is in the polarization having the weaker modulation strength.

In the context of this specification, the terms 'modulation strength' and 'modulation efficiency' are used interchangeably to mean a ratio of the modulation amplitude of a propagation characteristic of light in the waveguide, such as the effective propagation constant of the guided light, to the amplitude of the RF signal in the respective RF electrode that causes the modulation of the propagation characteristic.

The relative strength of modulation for the two polarizations depends primarily on the ratio of the electro-optic tensor coefficients r33 and r13 for each polarization, but also on the overlap integral between the electric field from the applied RF signal and the optical mode profile. For example, in a z-cut LN modulator, the strength of modulation in the TM mode is approximately three times stronger than that found in the TE mode. By launching 96.4% of the light into the TE mode and only 3.6% of the light into the TM mode, the resulting transfer curve has a linear portion near the half power point, as shown in FIG. 8. The device acts as two independent virtual MZIs, one for each polarization, which outputs mix incoherently to linearize the transfer function. Each virtual MZI must be biased independently to the half power (quadrature) point and those bias points must be maintained during operation of the device. The bias electrode structure 44 having three electrodes is used to bias the light in each polarization independently by applying three different voltages to the three electrodes. This results in both vertical and horizontal field components that interact independently with light in the two polarizations.

The conventional LINMOD 40 using two polarizations has several drawbacks. One drawback is that the ratio of optical power in the two polarizations must be carefully maintained to within a percent of target. Another drawback is the need to bias light in two different polarizations. The bias control of two polarizations adds complexity to the system. Any polarization crosstalk after the modulator can seriously degrade CSO suppression. As little as −30 dB polarization crosstalk reduces CSO suppression to only about 20 dB.

U.S. Pat. No. 5,031,235, which is incorporated herein by reference, describes another approach which uses two polarizations. In '235, light from two different light sources that combine incoherently are used instead of light from two orthogonal polarizations. The wavelengths are chosen to be far enough apart such that frequency components from coherent beating are much higher than the bandwidth of the photodetector at the receiver. That '235 device requires two MZ's and hence two RF electrodes instead of one. As before, the frequency response of the RF electrodes must be carefully matched.

An object of the present invention is to provide an improved linearized waveguide modulator utilizing a single RF electrode in at least one modulation section thereof, which obviates at least some of the drawbacks of the prior art modulators.

SUMMARY OF THE INVENTION

Embodiments of the invention described herein eliminate several of the problems of conventional LINMODs, and some embodiments also have additional benefits such as the suppression of Relative Intensity Noise (RIN) from the light source. The frequency response matching problem is solved by utilizing a single electrode to modulate two or more MZI's in parallel. The electrode structure is designed to modulate a plurality of waveguides with modulation efficiencies that may be different, but track each other over a target frequency range. Pairs of waveguides may have matched modulation frequency response, or the modulation response in a pair of waveguides may be matched over a frequency range but lowered by some ratio in comparison to another pair of waveguides. Some of the embodiments are directed to differential detection in order to cancel out laser RIN and/or CSO components. Exemplary topologies described hereinbelow allow for independent biasing of all constituent MZIs.

Accordingly, the present invention relates to a waveguide modulator which comprises: a substrate comprising electro-optical material, an optical splitting arrangement (OSA) formed in the substrate for splitting input light into four light portions, an optical combining arrangement (OCA) formed in the substrate for combining a first two of the four light portions into first combined light and a second two of the four light portions into second combined light, wherein the OSA is spaced apart from the OCA for defining therebetween a first modulation section, and four optical waveguides formed in the substrate and extending optically in parallel between the OSA and the OCA traversing the modulation section for separately guiding the four portions of light from the OSA to the OCA. An RF signal electrode and one or more ground electrodes disposed upon the substrate in the first modulation section in the absence of other signal electrodes therein so as to induce an RF electrical field in at least two of the four waveguides for modulating at least one of the first two light portions with a first modulation strength and for modulating at least one of the second two light portions with a second modulation strength so as to effect counter-phase modulation of the first and second combined light when the RF signal electrode is connected to a source of RF electrical signal.

According to an aspect of the present invention, at least one of the OSA and the OCA comprises an asymmetric coupler with a coupling ratio $R_{cplr}$ that is selected in dependence upon a modulation strength ratio $\Gamma$ of the first and second modulation strengths so that third-order distortions in the first and second combined light are of a substantially same magnitude and have opposite signs for mutually compensating each other when the first and second combined lights are combined into a single output light beam. The coupling ratio or the splitting ratio may be selected so that the first combined light is greater in power than the second combined light at an output of the OCA, and wherein the second modulation strength is greater than the first modulation strength.

Another aspect of the present invention provides a waveguide modulator, comprising a substrate comprising electro-optical material, an optical input port formed on the substrate for receiving input light, first and second output ports formed on the substrate for outputting first and second output light, an optical splitting arrangement (OSA) formed in the substrate and optically coupled to the input port for splitting the input light into four light portions, an optical combining arrangement (OCA) formed in the substrate and optically coupled to the first and second output ports for forming the first and second output light from the four light portions, wherein the OSA is spaced apart from the OCA for defining therebetween a modulation section of the waveguide modulator, and first, second, third and fourth optical waveguides formed in the substrate and extending optically in parallel between the OSA and the OCA for guiding the four portions of light from the OSA to the OCA, with the second and third waveguides positioned in a space between the first and fourth waveguides. An RF signal electrode and one or more ground electrodes are disposed upon the substrate in the modulation section in the absence of other signal electrodes so as to induce an RF electrical field in each of the second and third waveguides when the RF electrode is connected to a source of RF electrical signal, wherein the one or more ground electrodes are disposed so as to shield the outer waveguides from the RF signal electrodes. The OSA comprises an optical beam combiner network for combining light from the first, second, and third waveguides into the first combined light, and for combining light from the second, third and fourth waveguides into the second combined light, so that light from each of the second and third waveguides is equally split between the first and second output ports. The waveguide modulator further comprises phase adjusting means for adjusting optical phases of light propagating in the first and forth waveguides, for adjusting an optical phase of light coupled from the second waveguide into the first output port, and for adjusting an optical phase of light coupled from the third waveguide into the second output port, so as to suppress third order modulation distortions in each of the first and second combined light and to effect a push-pull modulation of the first and second output light.

One aspect of the present invention provides a waveguide modulator that comprises a substrate of comprising electro-optic material sensitive to an electrical field directed normally thereto, three or more optical waveguides formed in the substrate generally in parallel to each other, and an RF electrode disposed upon the substrate and shaped to form a plurality of electrode segments with consecutive segments laterally offset from each other so that each electrode segment is positioned over one of the optical waveguides along a length thereof, each of the optical waveguide having at least one electrode segment disposed thereover. The total number of the electrode segments is at least $N_{sec}$, wherein $N_{sec} = 3 \cdot (N_{guide} - 1) + 1$, wherein $N_{guide}$ is a total number of the optical waveguides. The lengths of the electrode segments are selected so that modulation characteristics of light propagating in each of the optical waveguides substantially match over an operating frequency range of the waveguide modulator.

BRIEF DESCRIPTION OF THE DRAWINGS

The invention will be described in greater detail with reference to the accompanying drawings which represent preferred embodiments thereof, in which like elements are indicated with like reference numerals, and wherein:

FIG. 14(*b*) is a graph illustrating a frequency-dependent component of the difference between the modulation characteristics shown in FIG. 14(*a*);

FIG. 14(*c*) is a graph illustrating the chirp parameter for the two inner MZI structures for zero microwave-optical velocity mismatch, $\Delta N_{MO}=0$, and same simulation parameters as used in FIG. 14(*a*);

FIG. 15(*b*) is a graph illustrating a frequency-dependent component of the difference between the modulation characteristics shown in FIG. 15(*a*);

FIG. 15(*c*) is a graph illustrating the chirp parameter for the two inner MZI structures for non-zero microwave-optical velocity mismatch, $\Delta N_{MO}=0.05$, and other simulation parameters as used in FIG. 15(*a*);

FIG. 22(*b*) is a simulated graph illustrating an E-field transfer curve of a linearized waveguide modulator according to an embodiment of the present invention;

FIG. 23(*a*) is a graph illustrating the difference between the E-field transfer curve of the linearized MZ modulator as shown in FIG. 22(*b*) and a corresponding ideal linear transfer curve;

DETAILED DESCRIPTION

Figure 9:
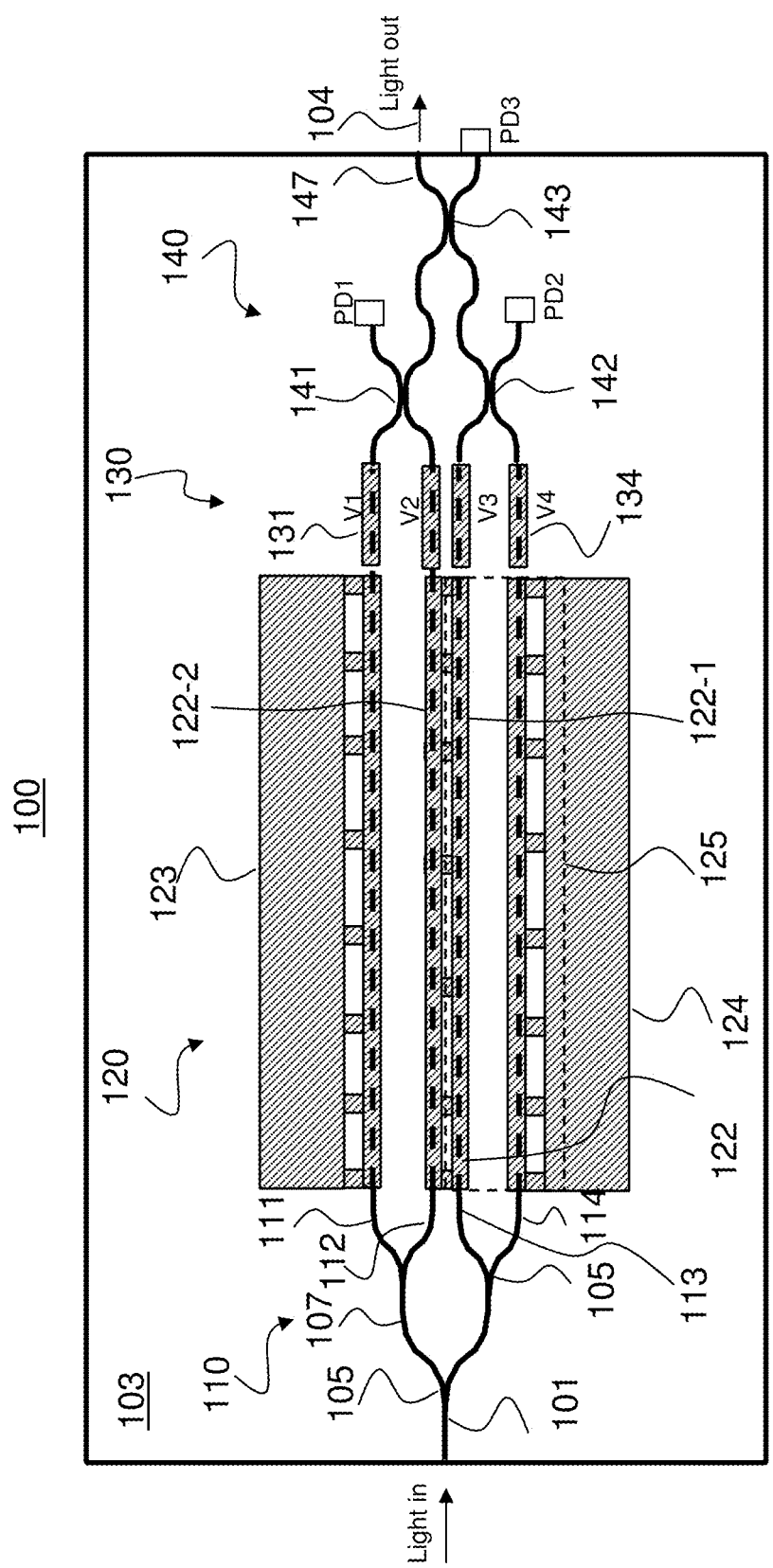
FIG. 9 is a schematic top-view diagram of a linearized waveguide modulator with four waveguides modulated by a single straight RF signal electrode in a Z-cut configuration.
Figure 10:
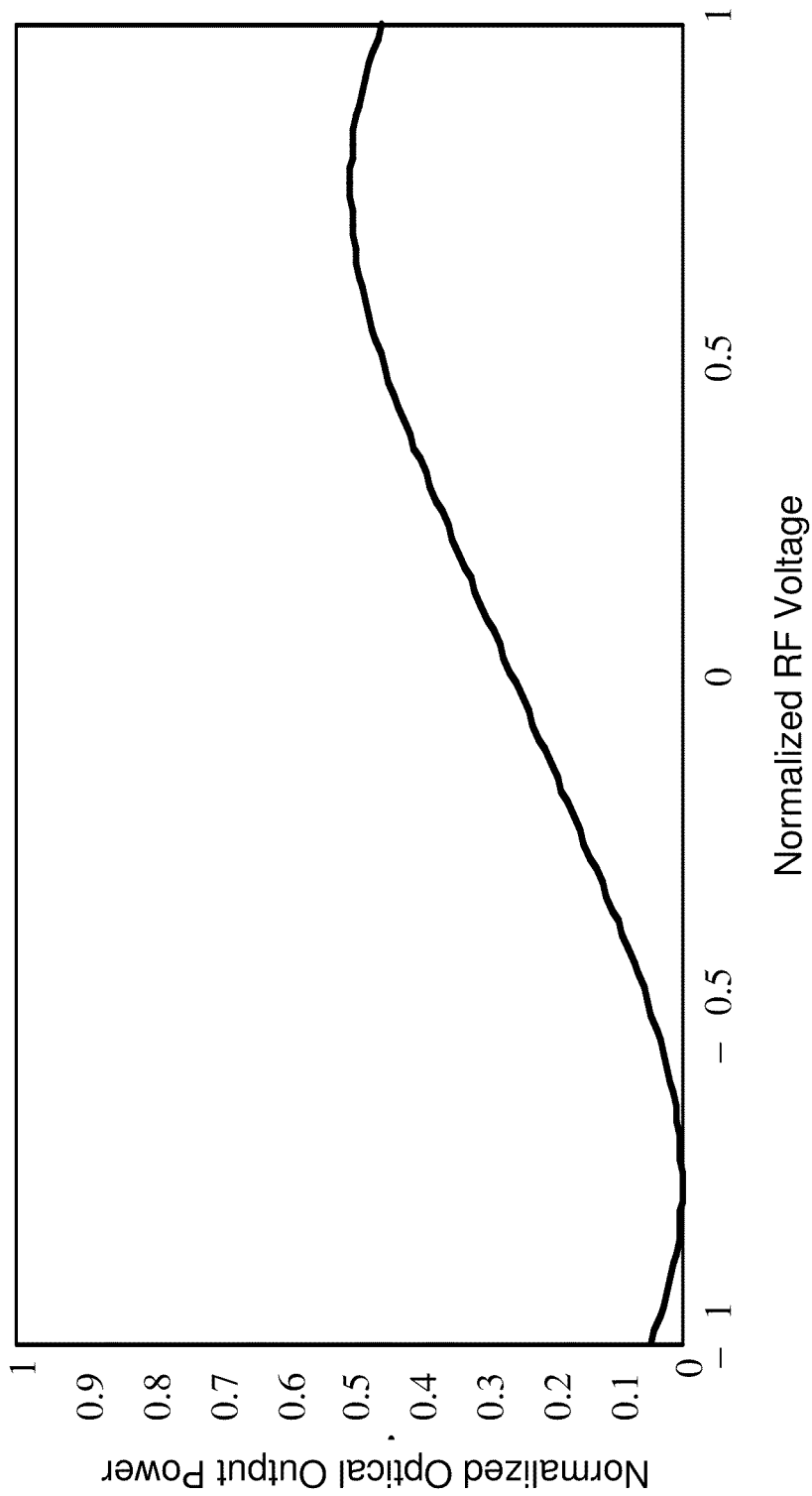
FIG. 10 is a transfer characteristic of the modulator of FIG. 9.

With reference to FIG. 9, there is illustrated a waveguide modulator 100 according to a first exemplary embodiment of the invention. FIG. 10 shows the transfer curve for the device. Note that the highest value in the transfer curve is about 0.5, indicating about 3 dB of optical penalty. The modulator 100 includes a modulation section 120 sandwiched between an input optical splitting arrangement (OSA) 110 for splitting input light launched in an input waveguide 101 into four light portions, and an optical combining arrangement (OCA) 140 for combining the four light portions into output light that exits the modulator 100 from an output waveguide 147, all formed in or upon a substrate 103 of an electro-optic material which refractive index is sensitive to a vertical electrical field that is normal to the plane of the substrate, such as a z-cut LiNbO$_3$ (LN). Technologies for forming optical waveguides in LiNbO$_3$ are well known in the art and will not be described herein. The modulation section 120 includes four optical waveguides 111 to 114 extending optically in parallel between the OSA 110 and the OCA 140 for guiding the four portions of light from the OSA 110 to the OCA 140. The waveguides 111-114 traverse the modulation section 120 in the direction from the OSA 110 to the OCA 140, which is referred to hereinafter as the longitudinal direction, and are spaced from each other in a lateral direction, i.e. in the direction perpendicular to a general direction of light propagation in the waveguides 111-114. The waveguides 112 and 113, which will be referred to as the inner waveguides, are disposed between the waveguides 111 and 114, which will be referred to as the outer waveguides. The modulation section 120 is also referred to herein as the first modulation section.

The modulator 100 has a single RF signal electrode 122 and two ground electrodes 123, 124. In the shown embodiment, the single RF signal electrode 122, which will also be referred to herein as the signal electrode or the RF electrode, is a twin electrode formed by a pair of sub-electrodes 122-1 and 122-2 in the form of narrow conducting stripes, each disposed over one of the two inner waveguides 112, 113 along a length thereof in a generally straight fashion. The sub-electrodes 122-1 and 122-2 are electrically connected at multiple locations along the length thereof with conducting bridges to maintain the same voltage on both sub-electrodes along the length of the pair. In another embodiment, the single RF signal electrode may be in the form of a single wider conducting stripe covering both inner waveguides 112, 113, which may however result in a smaller modulation efficiency. Ridge structures in the substrate 103, for example as described in an article K. Noguchi, et. al., "Millimeter-wave Ti:LiNbO3 optical modulators," IEEE Journal of Lightwave Technology, Vol. 16, No. 4, April 1998, pp. 615-619, which is incorporated herein by reference, could be included under each sub-electrode 122-1,2, in order to improve modulation efficiency. The outer waveguides 111 and 114 reside underneath edges of the ground electrodes 123 and 124, respectively, with the ground electrodes 123 and 124 extending outwardly therefrom. There is no ground electrode between the outer waveguides 111, 114 and the inner waveguides 112, 113.

In the shown embodiment, the OSA 110 is formed with three Y-junction waveguide splitters 105 arranged to split the input light from the input waveguide 101 into the four different light portions which may be approximately equal in power, and to launch each of them into a different one of the four waveguides 111-114. The four waveguides 111-114, after traversing the modulation section 120 wherein the RF electrode 122 and the ground electrodes 123, 124 are located, and a bias section 130, connect to four inputs of the OSA 140. The OSA 140 includes three beam combiners 141-143 connected for combining the four light portions into the output light in the output waveguide 147. In the shown embodiment, all three beam combiner 141-143 are in the form of 2×2 waveguide couplers, with unused coupler outputs serving as waveguide taps that may be coupled to monitoring photodiodes indicated in FIG. 9 with labels 'PD1', 'PD2', and 'PD3'. In one embodiment, all three couplers 141, 142, 143 have preferably a substantially same coupling ratio $R_{cpl}$. The couplers 141 and 142 are designed to couple more light into the output coupler 143 from the outer, less modulated, waveguides 111, 114 than from the inner waveguides 112, 113, as defined by the coupling ratio $R_{cpl}$. In other embodiments, one or more of the couplers 141 and 142 may be moved into the OSA 110 to couple the light into the waveguides 111-114, with waveguide Y-junction combiners used in their place in the OCA 140. The couplers 141-143 are designed so as to have a specific coupling ratio $R_{cpl}$ as described hereinbelow. In one embodiment, the coupling ratio of one or more of the optical couplers 141, 142, and 143 are adjustable, for example electrodes (not shown) may be provided about a coupling region thereof as known in the art.

The RF electrode 122 traverses the modulation section 120 over the two inner waveguides 112, 113 and apart from the two outer waveguides 111, 114 so that it induces a stronger modulation in the two inner waveguides 112, 113 than in the two outer waveguides 111, 114. The substrate 103 has an inverted region 125, which is indicated in FIG. 9 by a dashed rectangle, extending laterally from one of the inner waveguides to a closest one of the outer waveguides, in the shown embodiment from the third waveguide 113 to the fourth waveguide 114, including the waveguides 113, 114 themselves, with the second inner waveguide 112 being outside of the inverted region 125. The inverted region 125 has an electro-optic domain structure that is inverted relative to a domain structure of a region of the substrate that extends laterally from under the second inner waveguide 112 to the other outer waveguide 111, so as to modulate light propagating in the outer waveguides 111, 114 in counter-phase, and to modulate light propagating in the inner waveguides 112, 113 in counter-phase. In addition, the modulation in waveguide 111 or 114 is inverted relative to that in waveguide 112 or 113, respectively, due to the inversion of the applied electric field under the signal and ground electrodes.

In the context of this specification, the ratio of the magnitude $\Delta\phi$ of the optical phase modulation at the output of a waveguide due to a voltage modulation with amplitude $\Delta V$ applied at the RF signal electrode, i.e. $\Delta\phi/\Delta V$, is referred to as the modulation strength M or the modulation efficiency for the waveguide.

When an RF signal is applied to the signal electrode 122, the inner waveguides 112, 113 experience push-pull modulation, i.e. optical phases of the light portions therein are modulated with a same magnitude $\Delta\phi_1$ but with opposite signs, i.e. in counter-phase, due to the domain inversion region 125 containing only one of those waveguides. The light portions that are launched in the inner waveguide 112, 113 by the OSA 110, recombine in the coupler 143 forming first combined light, which is push-pull modulated with a first modulation strength $M_1=(\Delta\phi_1/\Delta V)$.

Likewise, the outer waveguides 111, 114 also experience push-pull modulation due to the domain inversion region 125 containing only one of those waveguides, 114. However, the modulation strength for each of the outer waveguides 111, 114 is smaller in magnitude than the modulation strength for the inner waveguides 112, 113. The light portions that are launched in the outer waveguides 111, 114 by the OSA 110, recombine in the coupler 143 forming second combined light, which is push-pull modulated with a second modulation strength $M_2=(\Delta\phi_2/\Delta V)$, so that modulation strengths of the two light portions in the second combined light are equal in magnitude and opposite in sign. When the voltage applied to the RF signal electrode 122 is modulated, the first and second combined light are modulated in counter-phase, i.e. with a 180 degrees difference in the phases of their respective modulations. In this specification, when an RF electrode induces modulations of different strength in two waveguides, we will denote the ratio of the weaker of the two modulations to the stronger of the two modulations as γ. For the embodiment of FIGS. 9 and 11. $\gamma=M_2/M_1$.

The inner waveguides 112, 113 may be considered as arms of a first, or inner, MZI extending between the splitter 101 and the combiner 143, while the outer waveguides 111, 114 may be considered as arms of a second, or outer, MZI extending between the splitter 101 and the combiner 143. Preferably, the inner and outer MZIs operate at opposite slopes of their corresponding transfer curves.

The ratio of the modulation strength for each inner waveguide 112, 113 underneath the signal electrode 122 to the modulation strength for the outer waveguide 111 or 114 underneath the ground electrode 123 or 124 depends on the exact geometry of the RF electrode 122 and distances between the waveguides. In the following we will denote an absolute value of this ratio as $\Gamma$, which is always greater than 1. Note that $\Gamma=1/|\gamma|$. By way of example, $\Gamma$ may be in the range of 2 to 5. In the shown embodiment, the input light from an optical source is split equally into the four light portions by the OSA 110, passes through the modulation section 120 where the RF electrode 122 is located, and then combined unequally by the 3 couplers 141-143, in according with the coupling ratio $R_{cplr}$ of the couplers 141, 142.

By suitably selecting the coupling ratio $R_{cpl}$ in dependence upon the modulation strength ratio $\Gamma$, third-order distortions in the modulations of the first and second combined light in the coupler 143 may be made to have a substantially same magnitude and opposite signs, for mutually compensating each other when the first and second combined lights are combined into the single output light beam 104 by the output coupler 143, resulting in the output light wherein the third order modulation distortions are substantially suppressed. In particular, the coupling ratio $R_{cpl}$ of the couplers 141 and 142 may be selected to provide more light into the output waveguide 147 from the waveguides with lesser modulation strength, in this embodiment—from the outer waveguides 111, 114, than from the waveguides 112, 113 with the greater modulation strength.

In other embodiments, some or all of the couplers 141-143 may be placed within the OSA 110 in place of some or all of the Y-junction splitters 105, i.e. optically before the modulation section 120, as long as it produces desired relative contributions, as described hereinabove, from the inner and outer waveguide 111-114 in the optical field strength of the output light 104.

Equations (6a), (6b) hereinbelow can be used to determine the optimum value of the coupling ratio $R_{cplr}$ for achieving the suppression of the third order modulation distortions in the output light 104 for a given modulation strength ratio $\Gamma>1$:

$$R_{cplr} = \frac{1}{2}\left[1 - \frac{R^3 + 3R}{3R^2 + 2}\right], \quad (6a)$$

$$R = \frac{\Gamma - 1}{\Gamma + 1} \equiv \frac{1 - |\gamma|}{1 + |\gamma|}. \quad (6b)$$

In equation (6b), $|\gamma|$ denotes the absolute value of $\gamma$, which is less than 1. For example, for the case of $\Gamma=3$, R=0.5, and the optimum coupling ratio $R_{cplr}$ is about 20.5%. Note that in this embodiment all three couplers 141, 142, 143 have a substantially same target coupling ratio that is defined by equation (6a), so that in this example only about 20.5% of light entering each of this couplers through its top arm, remains within the top arm after the coupler, with the rest ~79.5% being coupled into the lower arm thereof, and vice versa. This selection of the coupling coefficient results in a transfer curve such as shown in FIG. 10, which has a high degree of linearity in the dependence of the optical output on the voltage applied to the RF electrode 122 in the voltage range between about $-0.5V_\pi$ to about $+0.5V_\pi$, wherein $V_\pi$ is a voltage resulting in a $\pi$ optical phase shift between waveguide arms. In this specification, we will be referring to such couplers that divide input light substantially unequally between their outputs, for example outputting more than 60% of incoming light into one of their two outputs, as optically asymmetric couplers.

The modulator 100 further includes the bias section 130 sandwiched between the modulation section 120 and the OCA 140, which the fours waveguides 111-114 traverse before connecting to respective inputs of the couplers 141, 142. Each of the four waveguides 111-114 is provided with a corresponding bias electrode 131-134 disposed over the waveguide, or other phase-shifting means for adding a cw phase shift to light propagating in a waveguide such as a deposition and trimming of a cladding layer on top of the waveguide. In operation, constant bias voltages V1, V2, V3 and V4 can be provided at the bias electrodes for inducing a constant electric field in each of the waveguides for biasing thereof as known in the art. By selecting suitable bias voltages V1, V2, V3 and V4, the modulator can be biased so as to place the operating point in the middle of the linear range of the transfer curve in FIG. 10, thereby substantially eliminating, or at least reducing, the $2^{nd}$ order distortions in the modulation of the output light 104. In particular, the bias voltages are selected so as to place the operating point of the device at opposite slopes of the inner and outer MZIs.

In one embodiment, the bias voltages V1 through V4 are selected so as to result in a 90 degree optical phase shift in the output waveguide 147 for the light portion from the first inner waveguide 112 relative to the light portion from the second inner waveguide 113, and −90 degree optical phase shift for the light portion from the outer waveguide 111 relative to the light portion from the second outer waveguide 114. Note that light coupled from one waveguide to adjacent waveguide in couplers 141, 142, and 143 acquires a 90 degree phase shift relative to the light remaining within the same waveguide. Accordingly, the bias voltages V1 through V4 are selected in this embodiment so as to add a zero degree relative optical phase shift between light exiting all four waveguides 111-114.

The coupling ratio of the couplers may need to be carefully optimized for the modulation strength ratio $\Gamma$, or vice-versa, in order to suppress the $3^{rd}$ order distortions to a target low level. In practice, it may be useful to find a means to fine tune the couplers to match the optimum coupling ratio for a given $\Gamma$, which is defined by the electrode/waveguide design. For example, tuning the wavelength of the source would change the coupling ratios by a small amount, due to the wavelength sensitivity of the couplers. Alternatively, the couplers 141-143 may be electronically tunable with electrodes on them (not shown) as known in the art. In the latter approach, three feedback loops may be used to control the coupling ratios of all three couplers.

Figure 11:
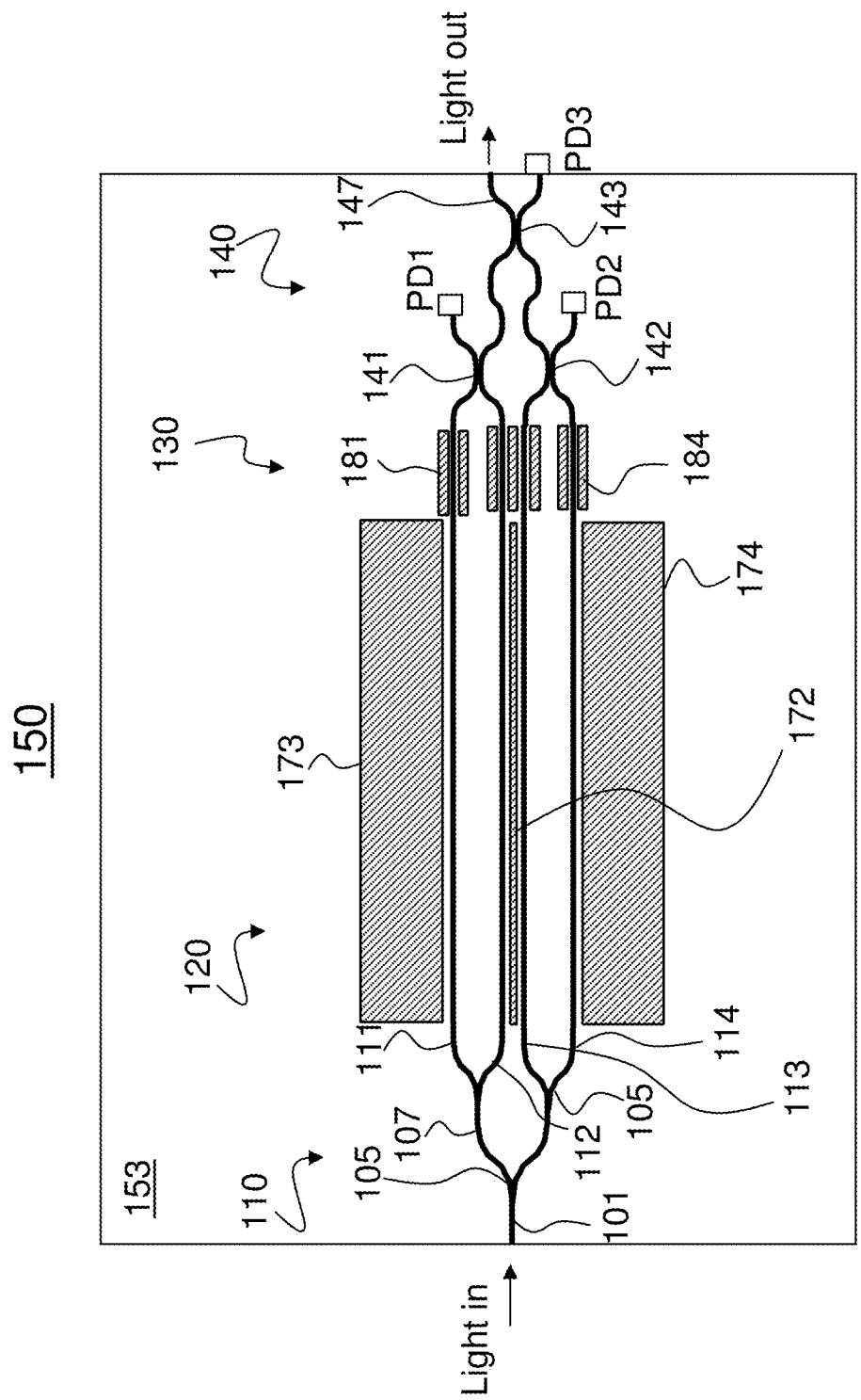
FIG. 11 is a schematic top-view diagram of a linearized waveguide modulator with four waveguides modulated by a single straight RF signal electrode in an X-cut configuration.

Turning now to FIG. 11, there is shown a modulator 200 according to an embodiment of the present invention. Like elements in FIGS. 9 and 11 are indicated with like reference numerals, and may not be further described with reference to FIG. 11 to avoid unnecessary duplication. The modulator 150 has a waveguide structure that has a substantially same topology as the waveguide structure of FIG. 9, but is fabricated in an electro-optic substrate 153 that is sensitive to in-plane electrical field, such as an X-cut LN, and has therefore a slightly different positioning of the electrodes to provide the approximately in-plane orientation of the electric field in the waveguides as known in the art. In particular, the single RF signal electrode 172 is disposed in-between the inner waveguides 112, 113 traversing the modulation section 120 of the device 150 in a generally straight fashion. The ground electrodes 173, 172 are disposed adjacent to the respective outer waveguides 111, 114 extending outwardly therefrom, so that the first and second waveguides 111, 112 are positioned in a space between the RF electrode 172 and the first ground electrode 173, and the third and fourth waveguides 113, 114 are positioned in a space between the RF electrode 172 and the second ground electrode 174.

In the x-cut modulator device 150, the value of the modulation strength ratio $\Gamma$ between the first modulation of the inner waveguides 112, 113 and the second modulation of the outer waveguides 111, 114 is likely to be different from that for the z-cut LN embodiment of FIG. 9, due to the different electrode design, requiring therefore a different value of the coupling coefficient for the couplers 141-143. As in the z-cut LN embodiment of FIG. 9, the inner waveguides 112, 113 closer to the RF signal electrode 172 experience stronger modulation than the outer waveguides 111, 114 that are closer to the ground electrodes. Due to the absence of ground electrodes in the space between the inner and outer waveguides, the outer waveguides experience although weaker, but substantially non-zero modulation. The sign reversal for modulation in the lower (in the figure) waveguides 113, 114 as compared to the upper (in the figure) waveguides 111, 112 is achieved by the geometry of the x-cut LN electrode and the opposite polarity of the applied electrical field within the respective upper and lower waveguides, hence no domain inversion is required.

In general, z-cut LN designs like that shown in FIG. 9 may require lower drive voltage than x-cut LN embodiments like the one shown in FIG. 11. However, the design in FIG. 9 has some drawbacks. First, the twin RF signal electrode 122 may not concentrate the electric field as strongly as the single, more narrow RF electrode 172. Secondly, the boundary of the domain inversion region 125 must be carefully aligned between the two inner closely spaced waveguides 112, 113, which by way of example may be spaced by about 15 to 25 micrometers (μm). Increasing the separation between the inner two waveguides improves manufacturability, which however in the modulator 100 comes at the expense of modulation efficiency, as the electric field concentration in the inner waveguides 112, 113 becomes even weaker when the sub-electrodes 122-1,2 in the twin signal electrode 122 are widely spaced.

Figure 12:
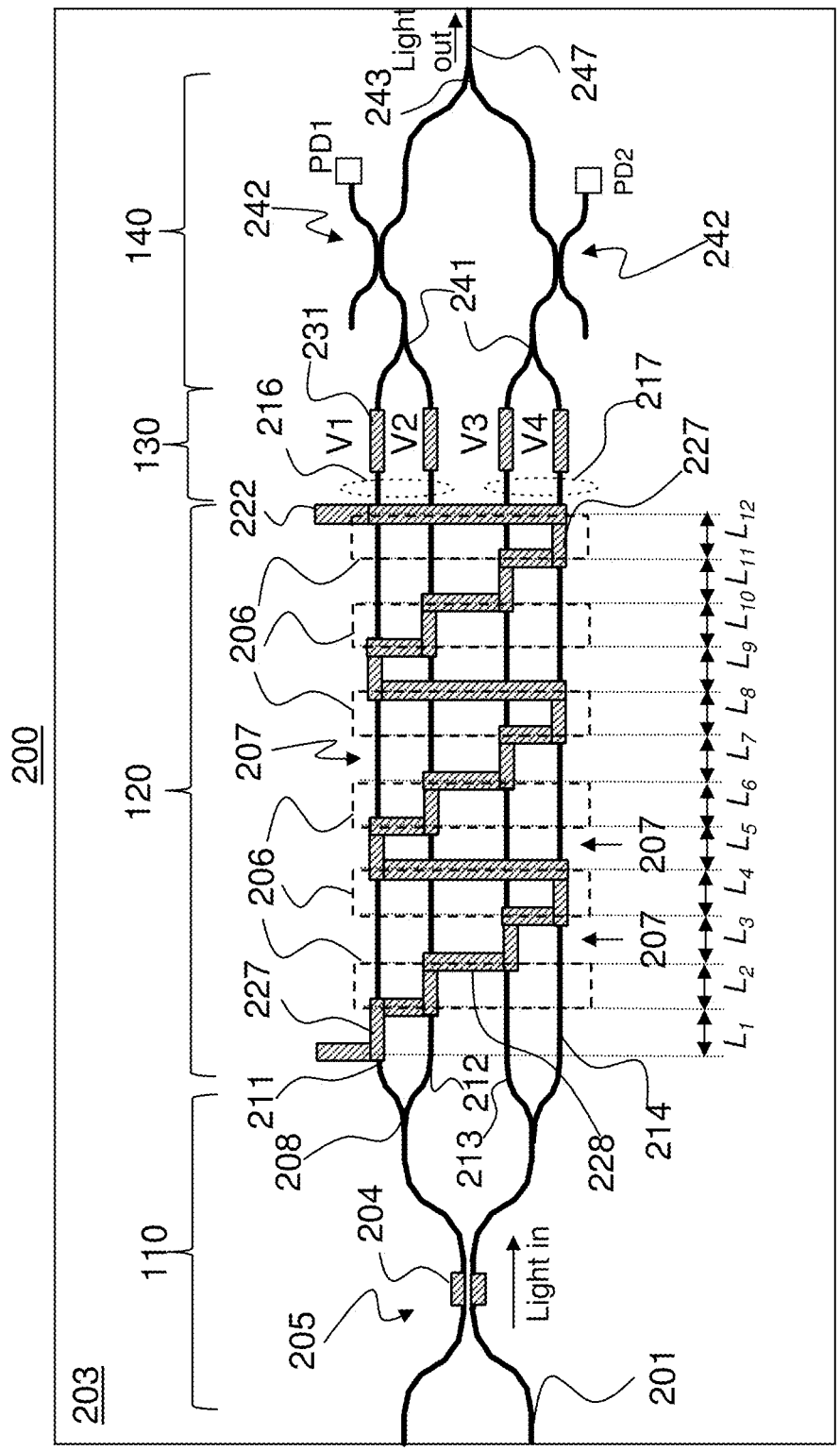
FIG. 12 is a schematic top-view diagram of a linearized waveguide modulator with four waveguides modulated by a meandering single RF signal electrode in an Z-cut configuration according to an embodiment of the invention.

With reference to FIG. 12, there is illustrated a modulator 200 fabricated in a vertical-field electro-optic substrate 203, such as Z-cut LN, according to an embodiment on the present invention. The modulator 200 overcomes the aforementioned field concentration issue of the modulator 100, by providing a single RF electrode 222 that meanders in the modulation section 120 between four optical waveguides 211-214. Advantageously, the RF electrode structure of the modulator 200 enables having a suitably large gap, for example about 20 μm or greater, between the inner waveguides 212 and 213, which simplifies manufacturing.

Figure 13:
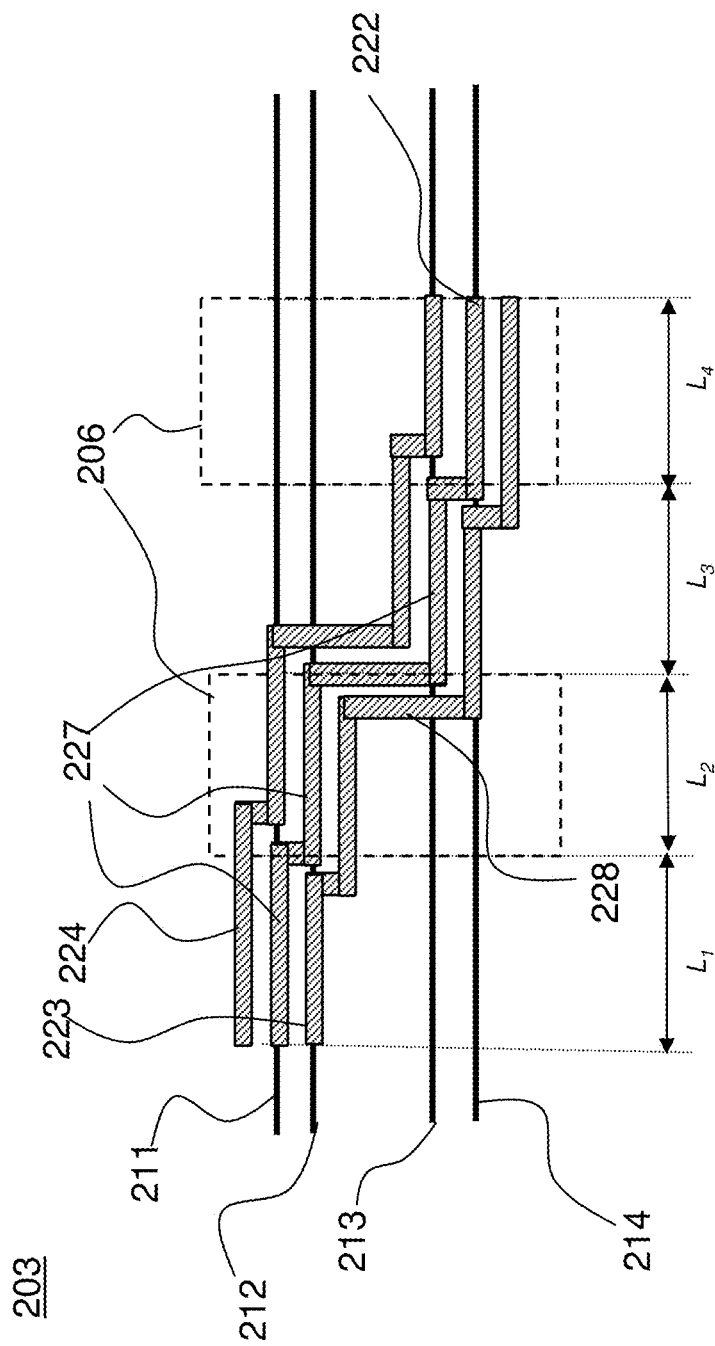
FIG. 13 is a top close-up view of a portion of the modulator of FIG. 12 illustrating ground electrodes thereof.

Ground electrodes are not shown in FIG. 12, but are illustrated at 223 and 224 in FIG. 13, which gives a close-up view of a portion of the modulation section 120 of the device 200. Generally, the ground electrodes 223, 224 have a substantially same meander shape as the RF electrode 222, and are disposed at both sides thereof with a gap suitable for providing desired electrical isolation and manufacturability. By way of example, the gap between the signal electrode 222 and each of the ground electrodes 224, 223 may be in the range from about 20 μm and 100 μm. The overall topology of the modulator 200 is similar to that of the modulators 100 and 150, with one input waveguide 210 providing input light into the OSA 110, one output waveguide 247 for outputting output light beam from the OCA 140, and four waveguides 211-214 optically coupled between the OSA 110 and the OCA 140 traversing the modulation section 120. Ridged structures could also be incorporated around the waveguides 211-214 as well, in order to reduce the required drive voltage. However, in the shown embodiment the input optical splitter 205 in the OSA 110 is in the form of an optical coupler.

The optical coupler 205 may optionally include electrodes 204 disposed in the coupling region thereof, for tuning the coupling ratio $C_{cplr}$ of the optical coupler 205. The OCA 140 is formed by a cascade of three optical combiners 241 in the form of waveguide Y-junctions, with two optional tap couplers 242 for monitoring purposes. The first and second waveguides 211 and 212 coupled between a first pair of Y-junctions 208 and 241 form a first inner MZI structure 216, while the third and fourth waveguides 213, 214 coupled between a second pair of Y-junctions 208 and 241, form a second inner MZI structure 217.

The substrate 203 has a plurality of domain inversion regions 206, so as to provide in the modulation section 120 an alternating domain structure along each of the waveguides 211-214, the alternating domain structure formed by the domain inversion regions 206 interlaced with non-inverted regions 207. The RF signal electrode 222 is shaped to meander over the four waveguides 211-214 forming a plurality of electrode segments 227, wherein each consecutive electrode segment is aligned with and extends over a different one of the optical waveguides 211-214 along a length $L_j$, thereof, substantially corresponding to a region 206, 207 of the alternating domain structure underneath said segment 227. The consecutive electrode segments 206 are joined with lateral electrode jogs 228 disposed over or close to boundaries of the regions 206, 207. Each of the alternating-domain regions 206, 207 will also be referred to herein as a sub-section, with the length of the j-th sub-section marked as $L_j$ in FIG. 12, with a total of 12 sub-sections shown in the modulation section 120 in the modulator 200 of FIG. 12.

Similarly to the modulators 100 and 150, the input light entering the modulator 200 through an input waveguide 201, is split by the OSA 110 in four light portions. A first two of the four light portions which travel over the first two 211, 212 of the four waveguides 211-214 are recombined by one of the first two combiners 241 into a first combined light, while the second two of the four light portions which travel over the second two 213, 214 of the four waveguides 211-214 are recombined by the other of the first two combiners 241 of the OCA 140 into a second combined light, with the first and second combined light then combined by the output combiner 241 of the OCA 140 into a single output light beam that leaves the modulator through the output waveguide 247.

For each of the waveguides 111, 112 of the first MZI structure 216, the electrode segments 227 are aligned with, and positioned over one of the two waveguides, 212, only within the inverted regions 206, and are positioned over the other of the two waveguides, 211, only within the non-inverted regions 207, for effecting a counter-phase modulation of these waveguides and the first two light portions propagating therein. Similarly, within each of the waveguides 213, 214 of the second MZI structure 217, the electrode segments 227 are positioned over one of the two waveguides, 214, only within the inverted regions 206, and arc positioned over the other of the two waveguides, 213, only within the non-inverted regions 207, for effecting a counter-phase modulation of the waveguides and the second two light portions propagating therein. Furthermore, this electrode-domain structure results in counter-phase modulation of the first and second combined light at the outputs of the combiners 241, i.e. in a 180° modulation phase shift therebetween.

Similarly to the modulators 100 and 150, the modulator 200 includes a bias section 130, which is shown after the modulation section 120, but may also be disposed before the modulation section in other embodiments. Each of the four waveguides 211-214 is provided with a corresponding bias electrode 231 disposed thereover, or other phase-shifting means for adding a cw phase shift to light propagating in a waveguide, including the deposition and trimming of a cladding layer on top of the waveguide. By selecting suitable bias voltages V1, V2, V3 and V4, the modulator 200 can be biased so as to place the operating point in the middle of a linear range of the transfer curve thereof, thereby substantially eliminating, or at least reducing, the $2^{nd}$ order distortions in the modulation of the output light beam from the modulator 200. Furthermore, the bias voltages V1, V2, V3 and V4 are selected so as to place operating points of each of the inner and outer MZIs 216, 217 at opposite slopes of their respective transfer curves so as to provide for the compensation of the third-order nonlinearities.

In one embodiment, the bias voltages V1 to V4 are selected so as to effect a $\pi/2$ optical phase shift between the light portions propagating in the first waveguide 211 relative to the second waveguide 212 and $-\pi/2$ between the light portions propagating in the third waveguide 213 relative to the fourth waveguide 214, which additionally effects a $\pi/2$ optical phase shift between the first combined light from the first inner MZI 216 and the second combined light from the second inner MZI 217.

According to one aspect of the invention, the lengths $L_i$, i=1, ..., $N_{sec}$, of the electrode segments 227 are selected to result in a push-pull modulation of each of the first and second MZIs 216, 217, with a first ($M_1$) and a second ($M_2$) modulation strengths, respectively, that are related to each other according to a target modulation strength ratio $\gamma = M_1/M_2$. Here, we use the notation $\gamma = 1\backslash\Gamma$ to denote modulation strength rations that are less than 1. The coupling ratio $C_{cplr}$ is then selected in dependence on the modulation strength ratio $\gamma$, or vice versa, so that third-order distortions in the first and second combined light at the output of the combiners 241 are of a substantially same magnitude and have opposite signs for mutually compensating each other when the first and second combined lights are combined into the single output light beam by the output combiner 241.

According to another aspect of the invention, the lengths $L_i$, i=1, ..., $N_{sec}$ and the total number $N_{sec}$ of the electrode segments 227 are selected so that modulation characteristics $S_j(f)$ of light propagating in each of the optical waveguides substantially match over an operating frequency range ($f_{min}$, $f_{max}$) of the waveguide modulator the modulation characteristics of each of the other waveguides; here, j=1, ..., $N_{guide}$ indicates a waveguide that is being modulated, i.e. has a segment 227 of the RF electrode 222 disposed over a length thereof. The total number of modulated waveguides $N_{guide}=4$ in the shown embodiment. The term "substantially match over a frequency range" is used in the current specification to mean modulation characteristic $S_j(f)$ that track each other as functions of the modulation frequency f over a specified frequency range from $f_{min}$ to $f_{max}$, i.e. have substantially same frequency dependence but may differ by a constant frequency-independent offset value when plotted in decibels (dB) vs. the modulation frequency f in GHz. The modulation characteristic $S_j(f)$ may refer to the S21 (e-o-e) forward transfer characteristic of the modulator, from the source of the RF modulation signal that drives the RF electrode 222 to a voltage output from a broad-band photodetector coupled to measure the output light from the output 247 of the modulator 200 (not shown).

It is possible to match the frequency responses $S_j(f)$, yet arbitrarily choose modulation strength for each waveguide 211-214 by properly choosing the lengths of the electrode segments 227. By way of example, the modulation strength for the second inner MZI 217 is weaker than that in the first inner MZI 216, as defined by the ratio $\gamma$.

Note that modulation is only created within the inner MZI 216 when the signal electrode 222 is over either of the waveguides 211, 212, and modulation is only created within the Inner MZI 217, when the signal electrode is over one of the waveguides 213, 214. Furthermore, the edge of the ground electrode 223 or 224 is close to the waveguide 211 when the signal electrode 222 is over the next adjacent waveguide 212, and vice versa. Likewise, the edge of a ground electrode 223 or 224 is close to the waveguide 214 when the signal electrode 222 is over the adjacent waveguide 213, and vice versa. The lateral separation between the two waveguides in each of the inner MZIs 216, 217 is chosen to be large enough such that one of the two inner waveguides 212, 213 is not modulated when the other of the two inner waveguides 2112, 213 is under the signal electrode 222.

The number $N_{sec}$ of sub-sections, or regions 207, 206 of the alternating domain structure of the modulation section 120 in FIG. 12, may be chosen in dependence on the total number $N_{guide}$ of waveguides in the modulation section 120, and to be large enough in order that there are enough degrees of freedom in the design to match, up to a constant dB offset, the modulation strength experienced by light in the $N_{guide}$ waveguides at a plurality of $N_{freq}$ distinct modulation frequencies. Preferably, the modulation strengths should either be equal, or be related to each other by a fixed ratio or a fixed dB value.

We found, that a minimum number of required subs-sections, which is equal to the number of electrode segments 227, satisfies the following equation (7):

$$N_{sec}=(N_{guide}-1)N_{freq}+1 \qquad (7)$$

The term $(N_{guide}-1) N_{freq}$ in equation (7) accounts for the number of equations needed For relating the modulation strengths in $N_{guide}$ waveguides at $N_{freq}$ distinct frequencies. One additional constraint is that the total length of the modulator is typically limited by design constrains, so that the sum of the electrode segment lengths $L_i$ equals to a predetermined total length, $L_{tot}$. Hence, one additional degree of freedom in the design is needed. For example, matching the frequency response for the 4 waveguides 211-214 at 3 frequencies with the additional constraint of a fixed total length requires no less than 10 sections. FIG. 12 shows 12 alternating-domain regions 206, 207 within the modulation section 120, which is more such regions than is required. Solutions can be found for both 10 and 12 segment designs; we found however, that a design with only the first 10 alternating-domain regions 207, 206 may be less sensitive to optical-microwave velocity mismatch. In the embodiment of FIG. 12, this corresponds to removing, for example, the last two electrode segments 227, or equivalently setting the design parameters $L_{11}$ and $L_{12}$ corresponding their lengths, to zero:

$$L_{11}=L_{12}=0. \qquad (8)$$

A set of equations for determining the other electrode segment lengths $L_i$ may be derived by considering main factors that determine the frequency response of the modulation strength for each of the waveguides. If the velocity of the light propagating in the waveguide is matched with the microwave velocity, the modulation depth vs. frequency is determined by the RF loss of the RF electrode 222. Advantageously, any frequency response effects due to RF reflections between the RF electrode 222 and RF source or RF termination are common to all waveguides since they share the single RF electrode 222.

The voltage on the RF electrode 222 at any point, z, down its length may be given by equation (9), $$V(z,f) = V_0 e^{\frac{a(f)z}{2}}, \qquad (9)$$

where $V_0$ is the amplitude of the voltage at the input end of the RF electrode 222 and the RF attenuation $\alpha(f)$ may be approximated by equation (10), $$\alpha(f) = \alpha_{00} f + \alpha_{01} \sqrt{f} \tag{10}$$

where $\alpha_{00}$ is a component of the RF loss that increases proportionally with frequency, and $\alpha_{01}$ is a component of RF loss that increases with the square root of frequency. Radiative and dielectric losses tend to be captured by the former term while skin effect loss is captured by the latter term in the RHS of equation (10).

A normalized amplitude $F_{i,j}(f)$ of the phase shift experienced by the $j_{th}$ waveguide along the $i_{th}$ sub-section, at a modulation frequency f may be defined by equation (11), $$F_{i,j}(f) \equiv \frac{\Delta\phi(i,j,f)}{\pi} = \frac{\int_{z_{s,i}}^{z_{f,i}} V(z,f)\,dz}{V_\pi L} EO_{i,j} \tag{11}$$

where $\Delta\phi(i,j,f)$ is the total phase shift experienced by the $j^{th}$ waveguide in the $i^{th}$ modulator section at frequency f The quantity $V_\pi \cdot L$ is the applied DC voltage required to produce a $\pi$ phase shift between two waveguides in an MZI at low frequency multiplied by the length of that MZI. The phase shift for the $j^{th}$ waveguide in the $i^{th}$ section is found by integrating the RF voltage down the length of the RF electrode along that particular section. In the following we will denote the modulation experienced by a particular waveguide normalized to the total differential phase shift available for two waveguides in an MZI as $EO_{i,j}$, wherein the index i refers to consecutive sub-sections 206, 207 in the alternating-domain structure of the modulations section 120, and the index j indicates one of the waveguides 211-214, with the waveguide 211 corresponding to j=1, and the waveguide 214 corresponding to j=4.

By way of example, in a z-cut LN MZI, the waveguide underneath the signal electrode 222 may experience about 85% of the total available modulation while the waveguide underneath an outer edge of a ground electrode 223 or 224 experiences only 15% of the total available modulation, hence EO equals 0.85 for the waveguide under the signal electrode 222 and 0.15 for the waveguide under the outer edge of the ground electrode 223 or 224. For a waveguide positioned well underneath the ground electrode, EO is assumed to be zero for simplicity, however the equations presented herein can be used for all-non-zero EO values, for example, for close waveguide spacing. Table 2 hereinbelow provides exemplary $EO_{i,j}$ values for the modulator 200 of FIG. 12 with 12 sub-sections 206, 207.

The parameters $EO_{i,j}$ account for changes in modulation strength that occur as the RF electrode 222 is shifted laterally with respect to the waveguide's orientation. Substituting Equation 9 into Equation 11 and performing the integration, the following equation (12) can be obtained:

$$F_{i,j}(f) = 2\frac{EO_{i,j}}{\alpha(f)V_\pi L}(V(z_{s,i},f) - V(z_{f,i},f)) \tag{12}$$

At DC where f=0, Equation (12) yields equation (13)

$$F_{i,j}(0) = \frac{EO_{i,j}}{V_\pi L} V_0(z_{f,i} - z_{s,i}) \tag{13}$$

Summing all contributions from each section for each waveguide provides a total normalized amplitude of the phase shift for each waveguide:

$$F_{tot,j}(f) = \sum_{i=1}^{N_{sec}} F_{i,j}(f) \tag{14}$$

The total normalized amplitude of the phase shift experienced by the $j^{th}$ waveguide is recursively related to the other waveguides in according to equation (15):

$$F_{tot,j+1}(f_k) = c_j F_{tot,j}(f_k) \tag{15}$$

where j=1, . . . , $N_{guide}$ −1. The coefficients $c_j$ relate the amplitude of the phase shift experienced by the $j^{th}$ waveguide to the $(j+1)^{th}$ waveguide at frequency $f_k$.

In order to determine the coefficients $c_j$, the phase changes within each inner MZI 216, 217 need to be considered. For the case of modulation by a single tone at frequency f, the optical E field of the light leaving an inner MZI is given by equation (16)

$$E(f,t) = e^{j\frac{\Delta\theta_{MZ}}{2}\cos(2\pi ft)}\cos\left(\frac{\Delta\phi_{MZ}}{2}\cos(2\pi ft)\right) \tag{16}$$

where for inner MZI 216, $\Delta\theta_{MZ}$ and $\Delta\phi_{MZ}$ are defined as follows $$\Delta\phi_{MZ1} = \frac{\pi}{2}(F_{tot,1}(f_k) - F_{tot,2}(f_k)) \tag{17}$$

$$\Delta\phi_{MZ1} = \frac{\pi}{2}(F_{tot,1}(f_k) + F_{tot,2}(f_k)) \tag{18}$$

and for inner MZI 217, $\Delta\theta_{MZ}$ and $\Delta\phi_{MZ}$ are defined as follows:

$$\Delta\phi_{MZ2} = \frac{\pi}{2}(F_{tot,3}(f_k) - F_{tot,4}(f_k)) \tag{19}$$

$$\Delta\phi_{MZ2} = \frac{\pi}{2}(F_{tot,3}(f_k) + F_{tot,4}(f_k)) \tag{20}$$

Note that 'j' in equation (16) is not the waveguide index, but square root of (−1).
The variable j is a waveguide index in all other equations.

For the device 200 in FIG. 12, the inner MZI's 216, 217 should be free of chirp, i.e.

$$\Delta\theta_{MZ1} = \Delta\theta_{MZ2} = 0 \tag{21}$$

The phase modulation amplitudes $\Delta\phi_{MZ1}$ and $\Delta\phi_{MZ2}$ represent the first and second modulation strengths of the first and second combined light at the output of the inner MZIs 216, 217 respectively, and should relate to each other in accordance with the target modulation strength ratio $\gamma$:

$$\Delta\phi_{MZ2} = \gamma \Delta\phi_{MZ1} \tag{22}$$

Solving simultaneously for equations (17) through (22) results in the following relationships:

$$F_{tot,1}(f_k) = -F_{tot,2}(f_k) \quad (23)$$

$$F_{tot,3}(f_k) = -F_{tot,4}(f_k) \quad (24)$$

$$F_{tot,3}(f_k) = -\gamma F_{tot,2}(f_k) \quad (25)$$

Hence, $$C_1 = C_3 = -1 \quad (26)$$

and $$C_2 = -\gamma \quad (27)$$

In order to get good tracking of frequency responses across a range of frequencies, equation (15) must be satisfied at three or more frequencies across the range. We found that choosing frequencies at the minimum, middle, and maximum of the range of interest may result in excellent matching of the waveguide modulation strengths across the target frequency range. Hence, the following three frequencies $f_1, f_2$, and $f_3$ may be selected for matching the frequency responses of the waveguides:

$$f_1 = f_{min} \quad (28)$$

$$f_2 = \frac{(f_{min} + f_{max})}{2} \quad (29)$$

$$f_3 = f_{max} \quad (30)$$

where $f_{min}$ and $f_{max}$ are the minimum and maximum frequency of the target frequency range, respectively. For example, for a device operating from DC to 40 GHz, $f_k$=0, 20, and 40 GHz, respectively, for k=1, 2, 3. For $N_{guide}$=4, recursive Equation (15) results in three equations, with each equation solved at the three frequencies, resulting in 9 simultaneous equations. The last equation comes from the requirement that the sum of all sections equals a fixed total length:

$$\sum_{i=1}^{i=N_{sec}} L_i = L_{tot} \quad (31)$$

Equation (31), combined with the nine other simultaneous equations given hereinabove by the recursive equation (15), provides a grand total of 10 simultaneous equations for the case of four waveguides modulated by a single meandering RF electrode. At least 10 sections are needed to find a solution, however, solutions can also be found for a design with 12 sections. However, we found that the 10 section design may be more robust with respect to small amount of optical-microwave velocity mismatch in the modulator. To account for an optical-microwave velocity mismatch, equation 11 may be modified to include phase terms that account for walk-off between the optical and microwave fields. One skilled in the art would know how to generate such equations, which are not given herein for the sake of brevity.

Table 1 lists exemplary parameters and their typical values for the 10 simultaneous equations (15), (31). The parameter, $\alpha_{int}$, is the intrinsic chirp parameter for the MZIs. The values of $EO_{i,j}$ shown in Table 2 are derived from $\alpha_{int}$ using the following equations:

$$EO_{sig} = \frac{(1 + \alpha_{int})}{2} \quad (32)$$

$$EO_{gnd} = \frac{(1 - \alpha_{int})}{2} \quad (33)$$

Where $EO_{sig}$ is the value for $EQ_{i,j}$ for the waveguide nearest to the signal electrode, and $EO_{gnd}$ is the value for $EO_{i,j}$ for the adjacent waveguide which is closer to the edge of a ground electrode. For waveguides in the adjacent MZ, which are further from the signal electrode, and well underneath a ground electrode, the value of $EO_{i,j}$ is assumed to be zero. As stated before, these values may be slightly non-zero. These non-zero values can be easily included in the simultaneous equations and are not expected to change the results dramatically.

The parameter $L_{jog1}$ is the distance in electrode length needed to shift the signal electrode laterally from one waveguide to another within the same MZI 216 or 217, while $L_{jog2}$ is the distance in electrode length needed to shift the signal electrode laterally between the inner waveguides 212, 213. The large lateral jog, $L_{jog3}$, from waveguide 4 to 1 has length given by $$L_{jog3} = 2 L_{jog1} + L_{jog2} \quad (36)$$

TABLE 1

Parameters needed for solving simultaneous equations.

| Parameter | Value | Units |
|---|---|---|
| $\alpha_{int}$ | 0.70 | unitless |
| $\gamma$ | 0.60 | unitless |
| $\alpha_{00}$ | 0.006 | dB/(cm – GHz) |
| $\alpha_{01}$ | 0.21 | dB/(cm – GHz$^{0.5}$) |
| $L_{tot}$ | 5.0 | cm |
| $L_{jog1}$ | 10 | µm |
| $L_{jog2}$ | 50 | µm |

TABLE 2

$EO_{i,j}$ values. Rows correspond to values of j, while columns correspond to values of i.

| j,i | 1 | 2 | 3 | 4 | 5 | 6 | 7 | 8 | 9 | 10 | 11 | 12 |
|---|---|---|---|---|---|---|---|---|---|---|---|---|
| 1 | 0.85 | 0.15 | 0 | 0 | 0.85 | 0.15 | 0 | 0 | 0.85 | 0.15 | 0 | 0 |
| 2 | −0.15 | −0.85 | 0 | 0 | −0.15 | −0.85 | 0 | 0 | −0.15 | −0.85 | 0 | 0 |
| 3 | 0 | 0 | 0.85 | 0.15 | 0 | 0 | 0.85 | 0.15 | 0 | 0 | 0.85 | 0.15 |
| 4 | 0 | 0 | −0.15 | −0.85 | 0 | 0 | −0.15 | −0.85 | 0 | 0 | −0.15 | −0.85 |

Tables 3 and 4 list the lengths of the electrode segments 227 for the 10 and 12 segment designs for the exemplary modulator parameters listed in Tables 1 and 2.

TABLE 3

Lengths in cm for a 10 segment version of the modulator of FIG. 12.

| j | $L_j$ |
|---|---|
| 1 | 0.165 |
| 2 | 0.384 |
| 3 | 0.360 |
| 4 | 0.510 |
| 5 | 0.923 |
| 6 | 0.969 |
| 7 | 0.577 |
| 8 | 0.428 |
| 9 | 0.474 |
| 10 | 0.210 |
| 11 | 0 |
| 12 | 0 |

TABLE 4

Lengths in cm for 12 electrode segments as shown in FIG. 12.

| j | $L_j$ |
|---|---|
| 1 | 0.206 |
| 2 | 0.224 |
| 3 | 0.240 |
| 4 | 0.349 |
| 5 | 0.417 |
| 6 | 0.780 |
| 7 | 0.477 |
| 8 | 0.417 |
| 9 | 0.940 |
| 10 | 0.558 |
| 11 | 0.221 |
| 12 | 0.172 |

By selecting the coupling ratio $R_{cplr}$ of the coupler 204 in accordance with equation (2) with $A_{RF}=\gamma$ for a given value of the modulation strength parameter $\gamma$, the first and second combined light at the outputs of the optical combiners 241 have $3^{rd}$ order modulation distortions of same magnitude and opposite signs, resulting in the cancellation thereof in the output light beam of the modulator 200.

Figure 14A:
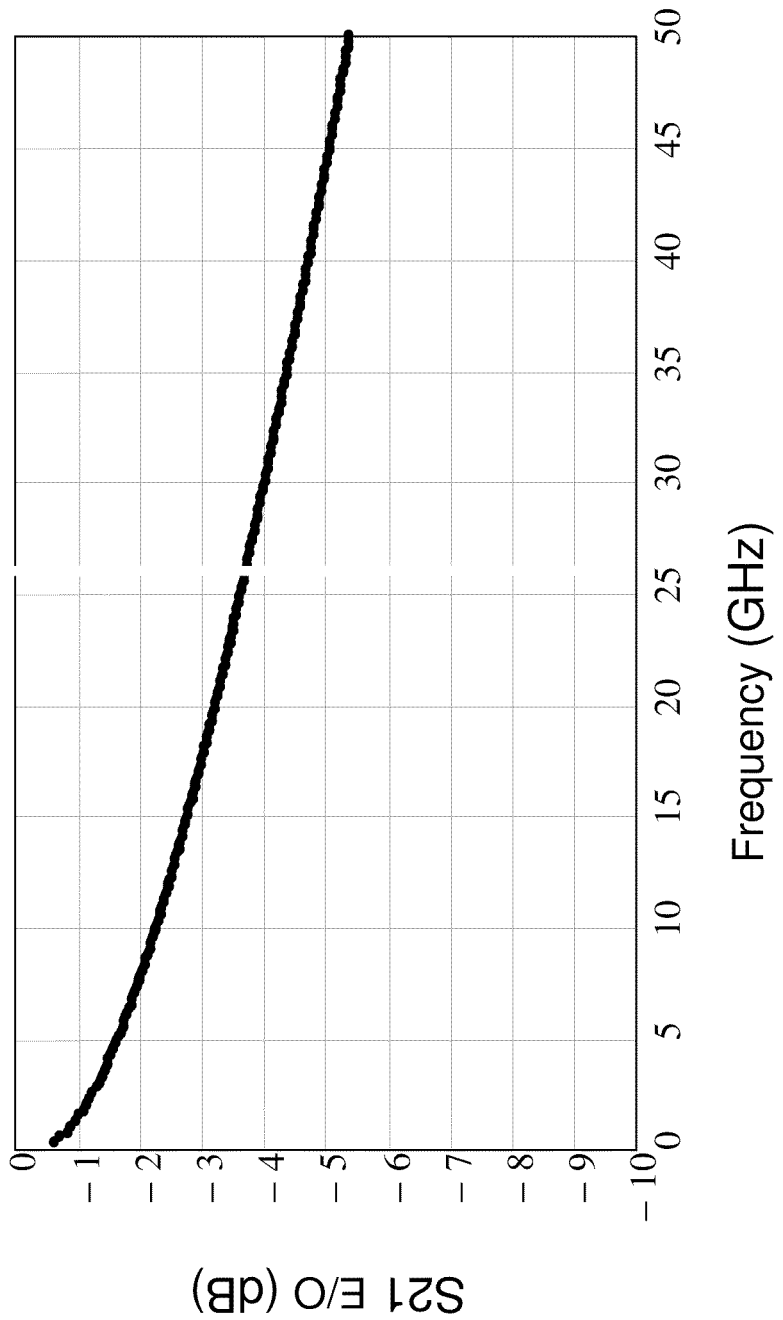
FIG. 14(*a*) is a graph illustrating the dependence of the modulation characteristics $S_{21}$ on the modulation frequency for two inner MZI structures of the modulator of FIG. 12 with 10 alternating domain regions for zero microwave-optical velocity mismatch, $\Delta N_{MO}=0$.
Figure 14B:
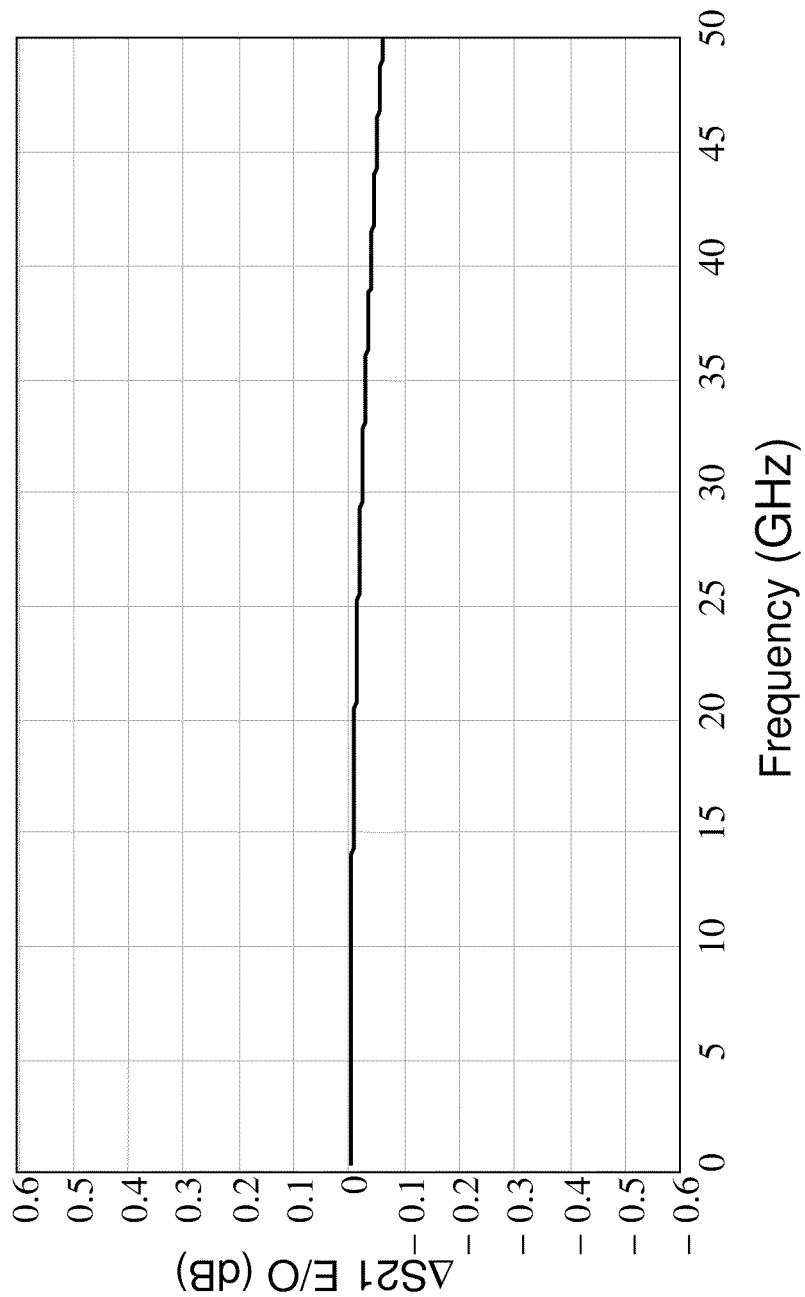

FIG. 14(a) shows the $S_{21}$ E/O frequency responses in dB for the two inner MZI's 216, 217, assuming zero velocity mismatch between optical and microwave fields. The difference in the microwave and optical indices, $\Delta N_{MO}$, is used to quantify that mismatch, which equals zero for this case. The trace of the second inner MZI 217 is shifted up by 4.4 dB in order to offset the shift in S21 E/O due to the value of γ which equals 0.60. The 4.4 dB shift causes the traces to overlap. The trace for MZI 216 is a solid line and that for MZI 217 is a dashed line. The two traces overlap so well that they are nearly indistinguishable. FIG. 14(b) shows the error in the tracking of the two responses, ΔS21 E/O, more clearly in dB. Note that the differences between the frequency responses of the two Inner MZIs is less than 0.1 dB.

In order to achieve linearization, the inner MZI's 216, 217 need to be free of residual phase change after the optical fields from the two arms thereof are combined. The residual phase change is conventionally quantified using the chirp parameter, see for example F. Devaux, et. al., "Simple measurement of fiber dispersion and of chirp parameter of intensity modulated light emitter," IEEE Journal of Lightwave Technology, Vol. 11, No. 12, December 1993, pp. 1937-1940, and US Patent Publication 2009/0093982, both of which are incorporated herein by reference. For a LN MZI having equal optical power in the two arms, the chirp parameter is equal to the sum divided by the difference of the modulation-induced phase shift in the two arms. By way of example, the magnitude of the chirp parameter for both of the two MZI's should be about 0.03 or less to achieve 30 dB suppression of 3rd order intermodulation products. A non-zero chirp parameter generally degrades the suppression of 2nd order distortion components. The 2nd order distortion components are generally proportional to a ratio of the 2nd derivative to the first derivative of the transfer curve at quadrature. By way of example, this ratio may be increased from zero to about 0.08 for the case of chirp parameter equals 0.03.

The chirp parameters for Inner MZ1 and Inner MZ2, $\alpha_{chirp,MZ1}$ and $\alpha_{chirp,MZ2}$, respectively, as a function of frequency are given by $$\alpha_{chirp,MZ1}(f) = \frac{\mathrm{Re}(F_1(f)+F_2(f))}{|F_1(f)-F_2(f)|} \tag{37}$$

$$\alpha_{chirp,MZ2}(f) = \frac{\mathrm{Re}(F_3(f)+F_4(f))}{|F_3(f)-F_4(f)|} \tag{38}$$

The normalized amplitude of the phase shift takes on a complex value when microwave-optical velocity matching are considered, hence the real portion of the sum over the magnitude of the difference provides a real value for chirp parameter even when velocity mismatch is considered.

Figure 14C:
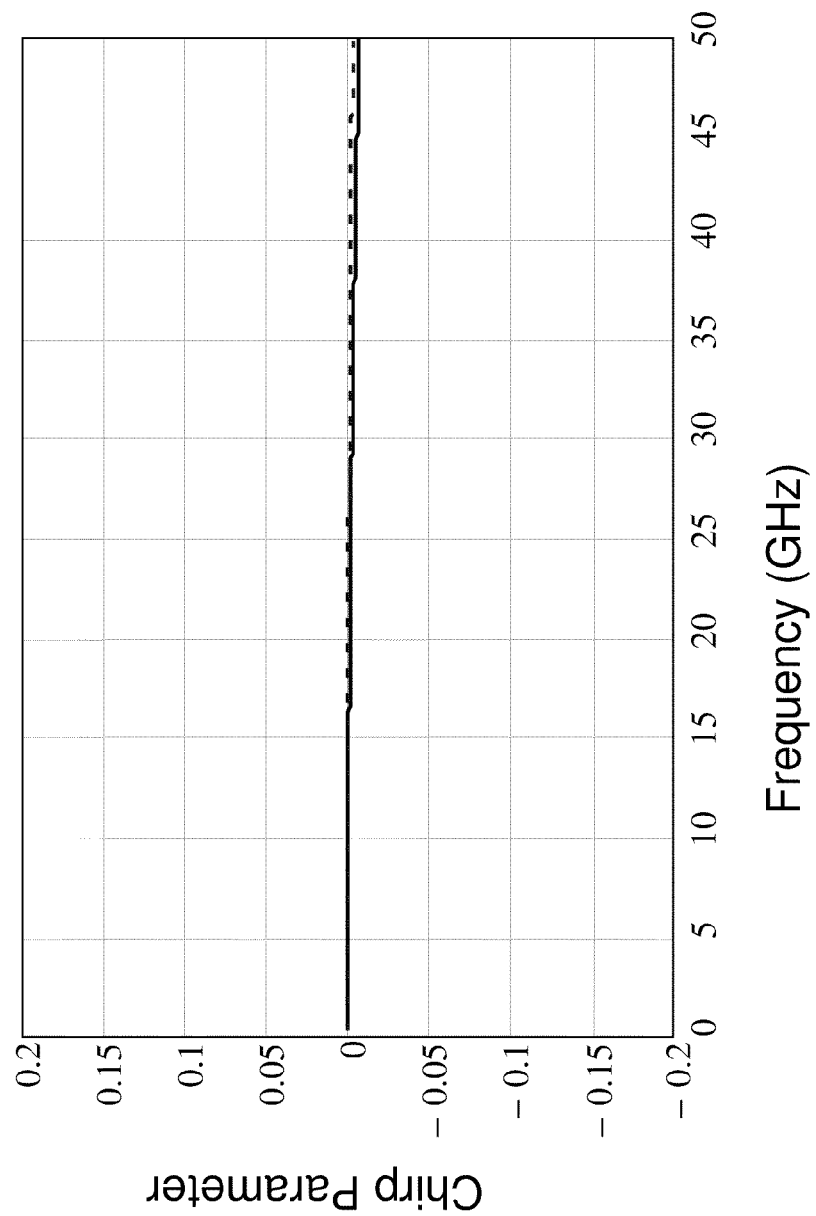
Figure 15A:
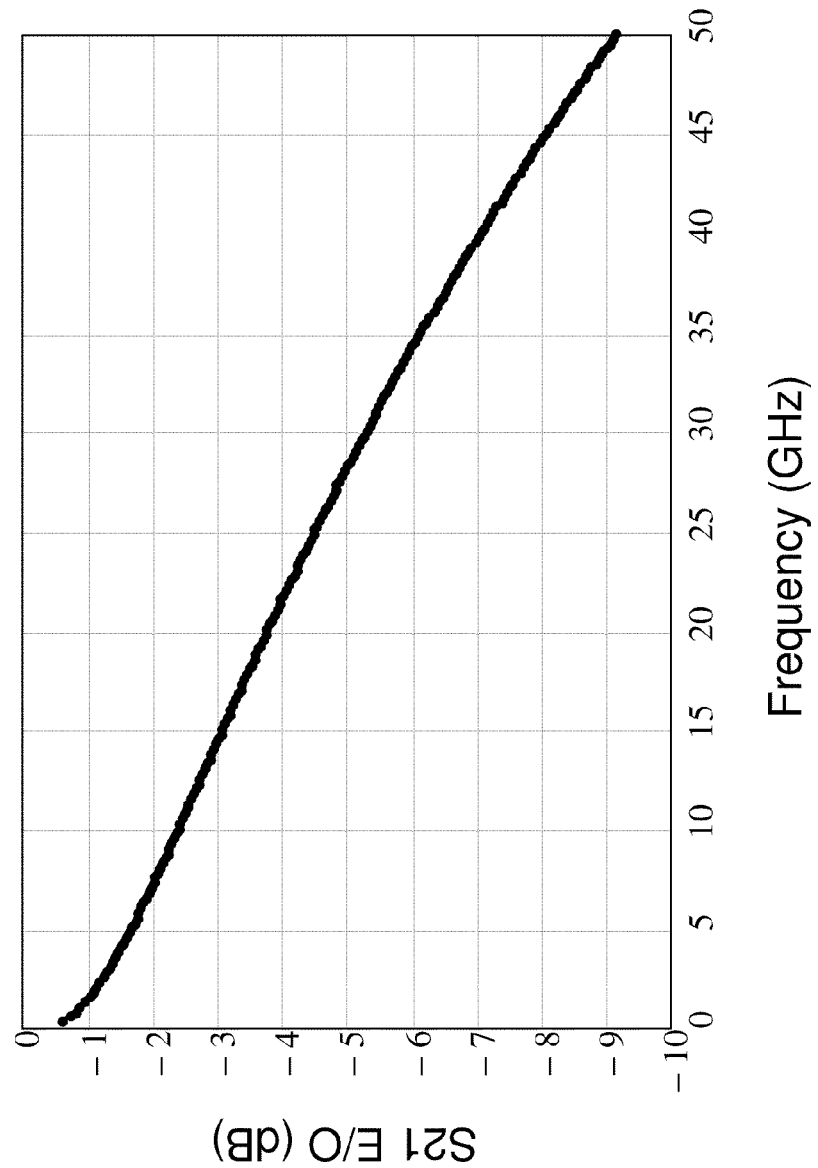
FIG. 15(*a*) is a graph illustrating the dependence of the modulation characteristics $S_{21}$ on the modulation frequency for two inner MZI structures of the modulator of FIG. 12 with 10 alternating domain regions for non-zero microwave-optical velocity mismatch, $\Delta N_{MO}=0.05$.
Figure 15B:
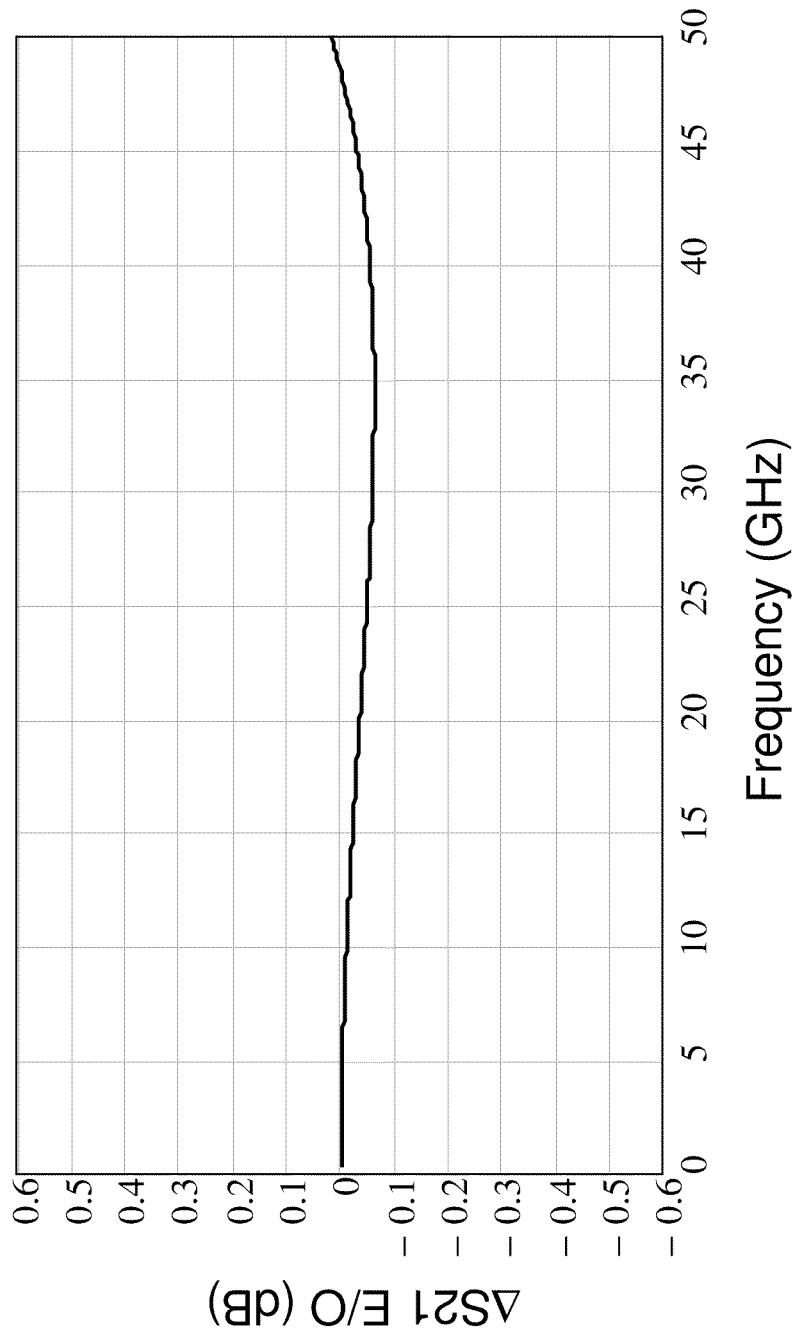
Figure 15C:
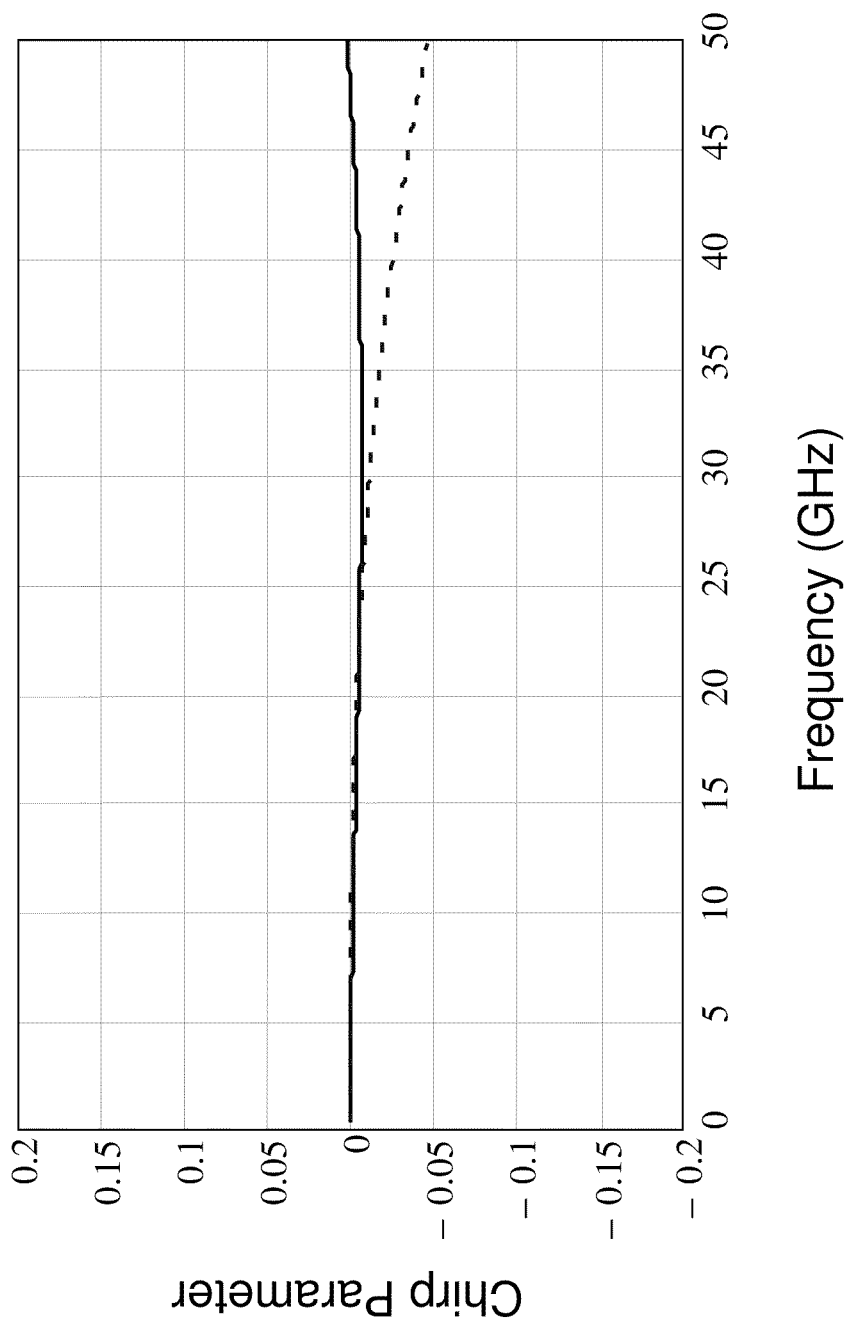

FIG. 14(c) shows the chirp parameter of both inner MZ's as a function of frequency for the 10 section design for $\Delta N_{MD}=0$. The solid and dashed lines correspond to Inner MZI 216 and Inner MZI 217, respectively. The chirp parameter is less than 0.01 for either MZI up to 50 GHz. FIGS. 15(a), 15(b), and 15(c) show the $S_{21}$ E/O frequency responses, $\Delta S_{21}$ E/O, and chirp parameter for the 10 section design with $\Delta N_{MO}=0.05$. The tracking error, $\Delta S_{21}$ E/O, is less than 0.1 dB and magnitude of chirp parameter in either MZ is less than 0.03 up to 40 GHz.

In the modulators 100, 150 and 200, a single RF electrode was shared by $N_{guide}=4$ waveguides. However, in other embodiments a single RF electrode may be shared by a large number $N_{guide}$ of waveguides.

Figure 16:
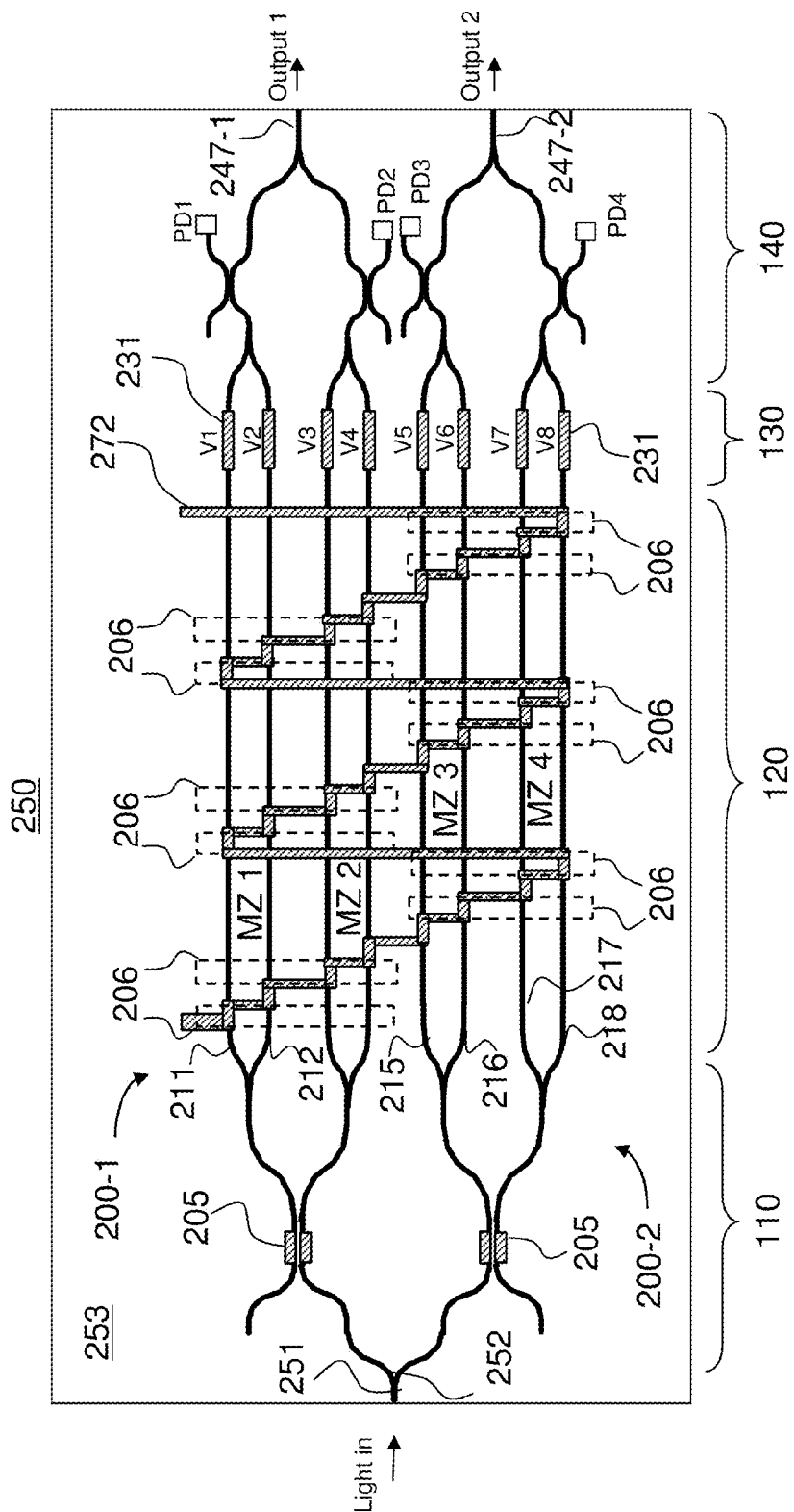
FIG. 16 is a schematic top-view diagram of a linearized waveguide modulator with eight waveguides modulated by a meandering single RF signal electrode according to an embodiment of the invention.

With reference to FIG. 16, there is shown a modulator 250 according to an exemplary embodiment of the present invention wherein a single RF electrode 272 is shared between 8 different waveguides 211-218 traversing in total 12 domain inversion regions 206 using 24 electrode segments. The modulator 250 may be viewed as two modulators 200 of FIG. 12, labeled in the figure as 200-1 and 200-2 and referred to as sub-modulators 200-i, with two sets of domain inversion regions 206. The sub-modulators 200-1 and 200-2 are formed side-by-side in parallel upon a same z-cut substrate 253, and are coupled at the inputs to an input waveguide 251 by an input optical splitter 252, for example in the form of a waveguide Y-junction, or alternatively in the form of a waveguide coupler, for splitting input light between the two sub-modulators 200-1 and 200-2. In another embodiment, the input coupler 252 and the input waveguide 251 may be omitted, resulting in a two-input, two-ouput device. Modulated light from the modulator 250 is output by means of two output waveguides 247-1 and 247-2. Each of the sub-modulators 200-i, i=1, 2 is linearized as described hereinabove with reference to the modulator 200 of FIG. 12. In this design, the two parallel linearized sub-modulators 200-i may be made to operate at opposite sides of their respective transfer curves by suitably selecting their bias voltages, thereby providing two complimentary output light beams that are modulated in counter-phase; one skilled in the art would know how to select suitable bias voltages to achieve this goal. The two complementary optical outputs from the output waveguides 247-i may be sent to a differential optical receiver (not shown) via two optical fibers for a differential detection, which would provide cancellation in the electrical output of the differential receiver of all common-mode optical noise, i.e. noise that is common for both outputs 247-i. For example, if the input waveguide 251 is fed from a laser, the relative intensity noise (RIN) of the laser light will be suppressed in the electrical output of the differential receiver. One drawback is that the modulator 250 requires twice the drive voltage of the design in FIG. 12 to drive the RF signal electrode 272, which is shared among 8 instead of 4 waveguides.

Continuing to refer to FIG. 16, matching $S_{21}$ frequency response and chirp between the 8 waveguides of the modulator 250 in 4 inner MZI's, which are labeled in FIG. 16 'MZI 1' to 'MZI 4', requires 22 in total sub-sections within the modulating region 120 in accordance with equation (7), assuming 3 frequencies (low, middle, high) are used for frequency matching of the waveguide modulation strengths. By way of example, the lengths $L_{23}$ and $L_{24}$ for the last two sub-sections are set to zero, which corresponds to an embodiment of the modulator 250 wherein the last domain inversion region 206 and two last segments of the electrode 272 are absent, so that each of the last two waveguides 217, 218 has only two electrode sections disposed over it. Table 5 lists the electrode segment lengths for this 22 section design. The S21 matching and chirp of the four MZ's is not quite as good as a design with only 4 waveguides, however, the magnitude of chirp parameter is still less than 0.03 and magnitude of $\Delta S21$ E/O for the four inner MZI's is still less than 0.35 dB up to 40 GHz, for the worst case of $\Delta N_{MO}=0.05$. The magnitudes of chirp parameter and $\Delta S_{21}$ E/O can be reduced by increasing the number of frequencies at which the S21 responses for the waveguides are matched, resulting in a design with more than 22 sub-sections.

Note that for each of the waveguides 211-218, odd-numbered electrode segments are disposed over the domain inversion regions 206 in the LINMOD 200-1, whereas even-numbered segments have domain inversion in LINMOD 200-2. The different ordering of domain inverted regions enables to operate LINMOD 200-1 on a positive slope of its transfer curve, and LINMOD 200-1 on a negative slope of its transfer curve. In this case, the optical power split ratio in the couplers 205 and the γ factor between Inner MZIs arc the same for both sub-modulators 200-i. The input optical coupler 205 of the LINMOD 200-2 has a coupling ratio equal to 100% minus the coupling ratio $C_{cplr}$ of the optical coupler 205 of the LINMOD 200-1, since the opposite inputs of the couplers are connected to the input waveguide 251.

TABLE 5

Lengths in cm for 22 segment design of the modulator 250 of FIG. 16.

| j | $L_j$ |
|---|---|
| 1 | 0.031 |
| 2 | 0.079 |
| 3 | 0.072 |
| 4 | 0.091 |
| 5 | 0.197 |
| 6 | 0.262 |
| 7 | 0.196 |
| 8 | 0.234 |
| 9 | 0.427 |
| 10 | 0.451 |
| 11 | 0.279 |
| 12 | 0.283 |
| 13 | 0.479 |
| 14 | 0.478 |
| 15 | 0.273 |
| 16 | 0.235 |
| 17 | 0.323 |
| 18 | 0.251 |
| 19 | 0.118 |
| 20 | 0.094 |
| 21 | 0.105 |
| 22 | 0.041 |
| 23 | 0 |
| 24 | 0 |

Figure 17:
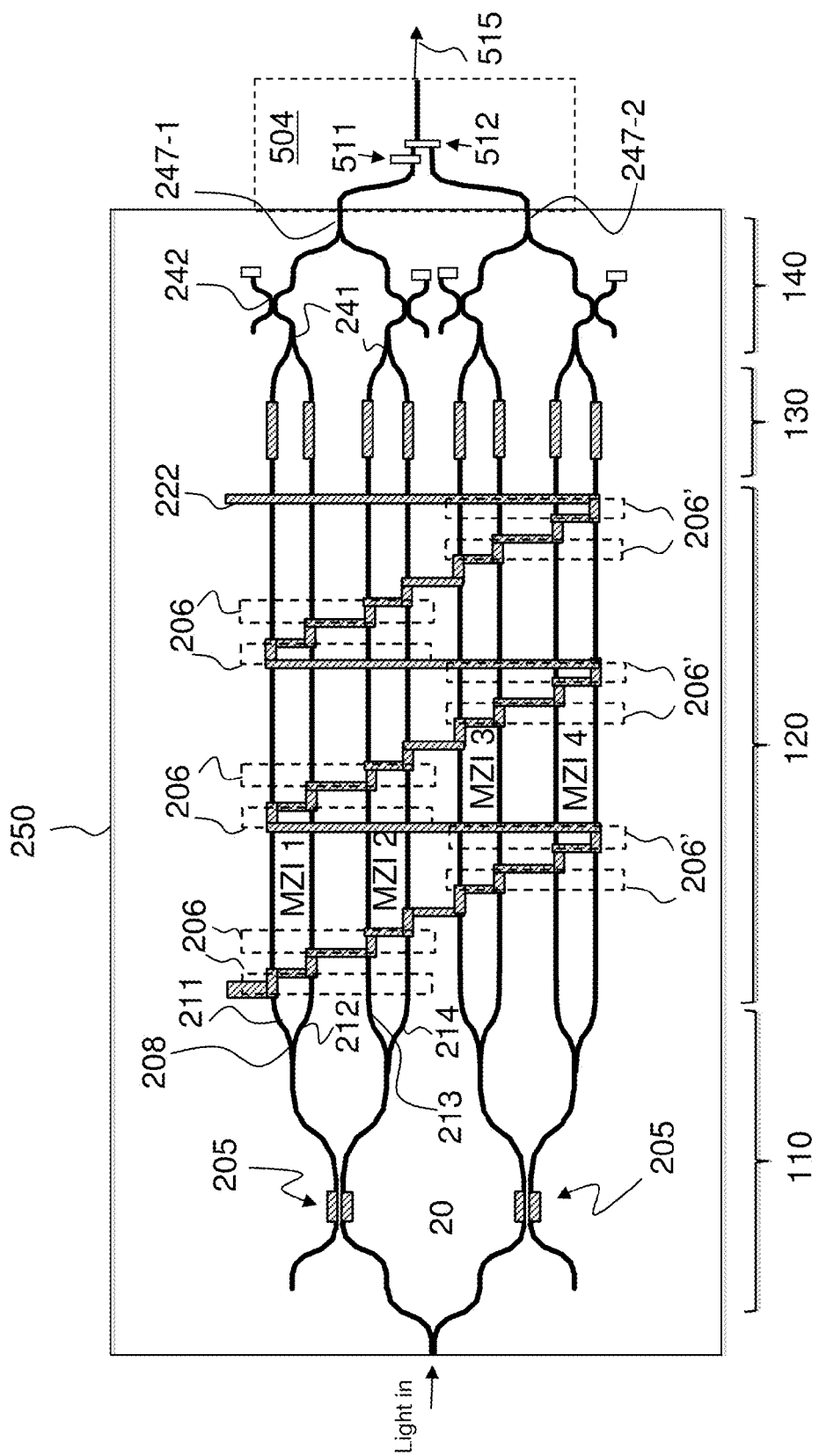
FIG. 17 is a schematic top-view diagram of a hybrid modulator wherein the linearized waveguide modulator of FIG. 16 coupled to a polarization multiplexing optical circuit.

With reference to FIG. 17, there is illustrated an exemplary hybrid modulator wherein the complimentary-modulated linearized outputs of the modulator 250 of FIG. 16 are polarization multiplexed using a polarization multiplexing optical circuit (PMOC) 504. A polarization rotator 511 rotates the polarization of light from the output waveguide 247-1. A polarization combiner 512 then combines the two orthogonal polarization states from the output waveguides 247-1 and 247-2 in a low loss fashion to form polarization-multiplexed output light 515. At a receiver (not shown), polarization controller followed by a polarization demultiplexer can be used to separate the two polarization multiplexed signals as known in the art, which can then be sent to a balanced differential receiver having two photodetectors wired for differential detection. The receiver will output a modulation signal wherein common-mode fluctuations, such as those resulting from the RIN of an optical source used to feed the modulator 250, are suppressed.

The embodiments described hereinabove were directed to linearized optical modulators (LINMODs) with a single modulation section 120 and a single RF signal electrode. However, other embodiments may have multiple modulation sections optically coupled in series, each of which including a different RF electrode shared between 2 or more waveguides.

Figure 18:
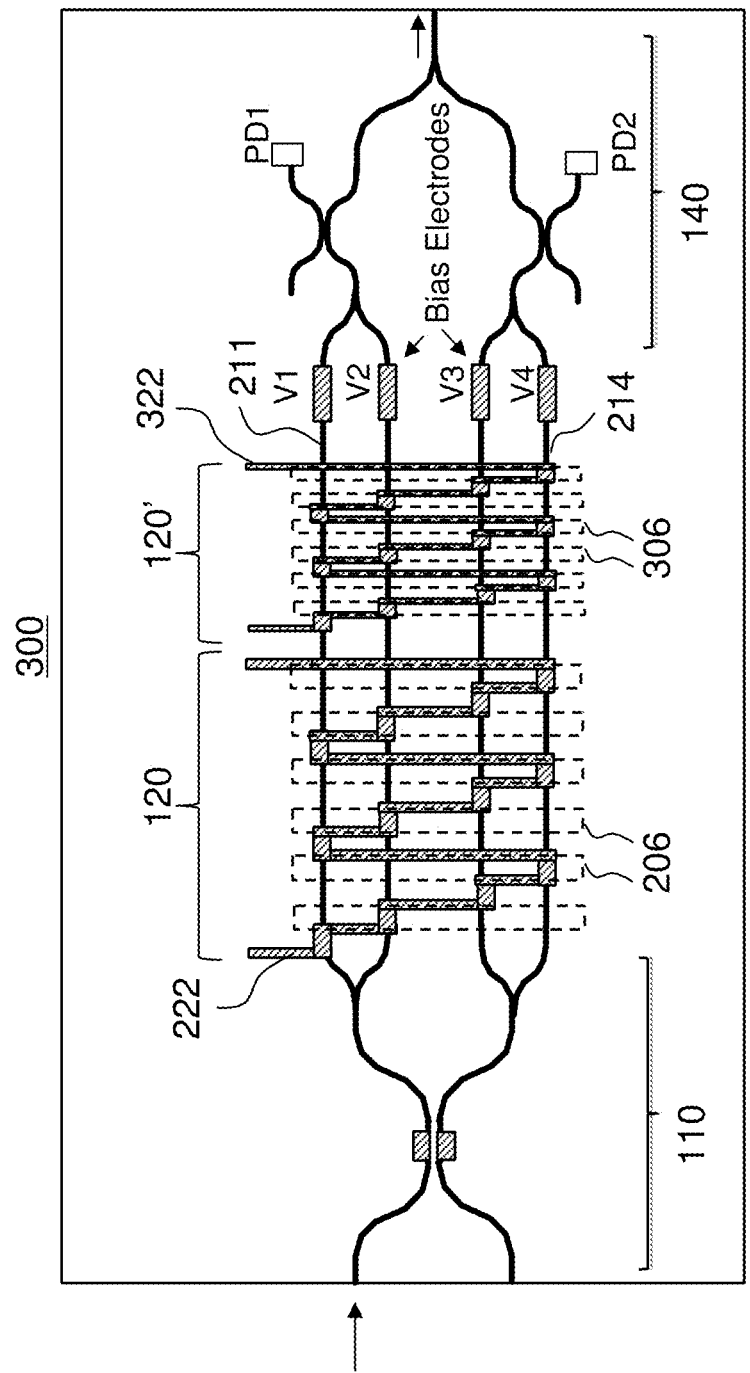
FIG. 18 is a schematic top-view diagram of a linearized waveguide modulator with four waveguides modulated by two meandering single RF signal electrodes in two separate modulation sections according to an embodiment of the invention.

With reference to FIG. 18, there is shown an exemplary modulator 300 which is similar to the modulator 200 of FIG. 12 in every respect, except that the modulator 300 includes a second RF electrode 322 which meanders in a second modulation section 120' to modulate each of the waveguides 211-214 along selected lengths thereof under respective segments of the second RF electrode 322. Similarly to the first modulation section 120, the second modulation section 120' includes a sequence of spaced domain-inversion regions 306 to form an alternate-domain structure of the second modulating section 120', each alternate-domain sub-section thereof corresponding in length to one of the waveguide-aligned segments of the RF electrode 322. In one embodiment, the number of electrode segments and the lengths thereof for each of the RF electrodes 222 and 322 are selected so that an RF signal applied to either of the RF electrode 222 or 322 alone results in a linearized signal output by the device 300. The multi-section architecture of the modulator 300 enables adding and scaling of multiple applied RF signals optically. Alternatively, two or more RF signals could be added electrically and then applied to the single RF electrode 222 in FIG. 12. The design in FIG. 18 enables the addition and scaling of electrical RF signals to be done optically-by the optical modulator. Such multi-section modulator architecture may be advantageous for generating multi-level coding of digital signals applied to the RF electrodes, for example, for the generation of Quadrature Amplitude Modulation (QAM) signals. Note that even when the modulation in each of the modulation sections 120, 120' is push-pull and balanced within the inner MZI's, the optical power is not balanced within the outer MZI including the inner MZIs within its arms, which may result in a non-zero chirp in the optical signal at the device output. This chirp would need to be accommodated in the system design.

Figure 19:
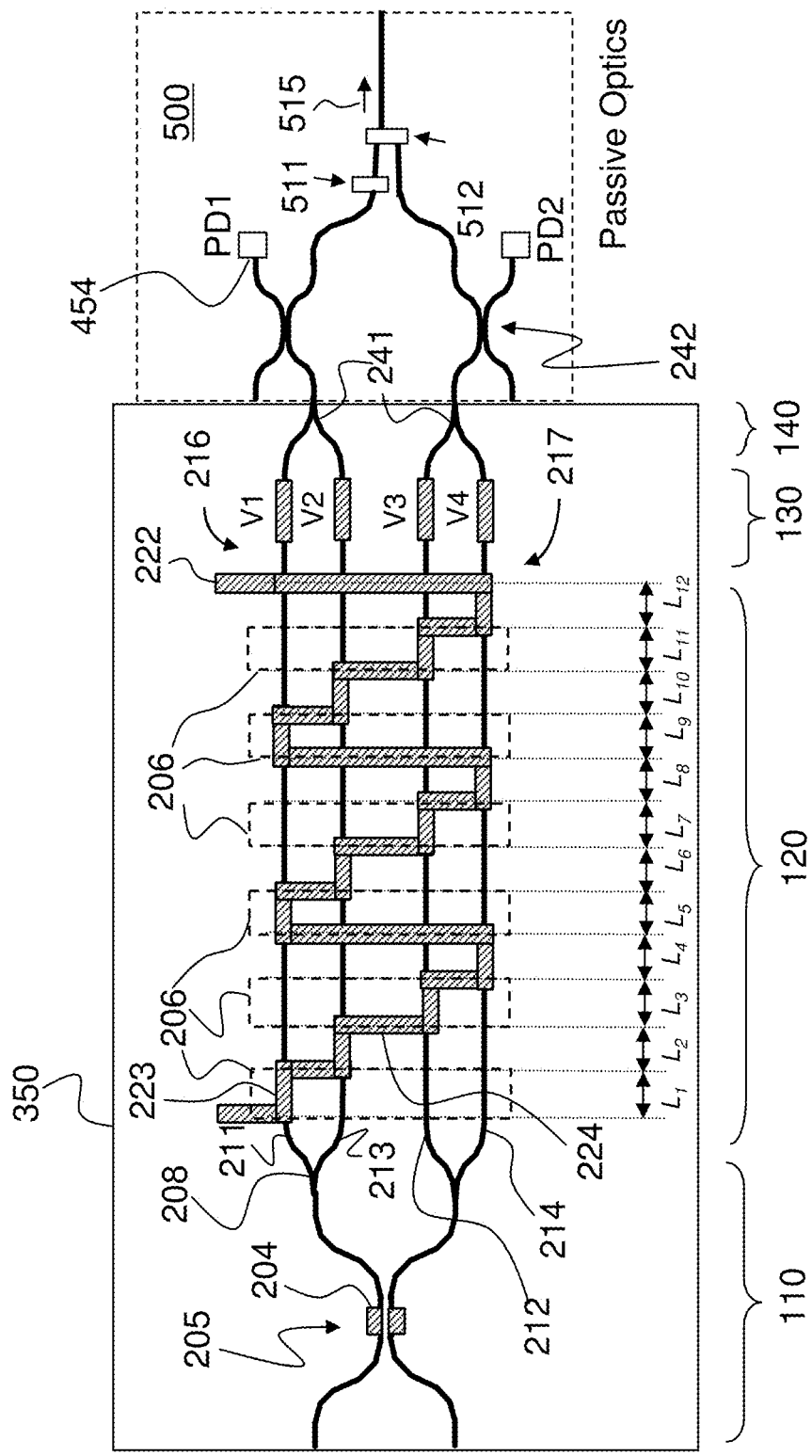
FIG. 19 is a schematic top-view diagram of a hybrid modulator wherein an embodiment of the linearized waveguide modulator of FIG. 12 with two optical outputs from two inner MZIs are coupled to a polarization multiplexing optical circuit.

Referring now to FIG. 19, there is shown a hybrid optical modulator according to another exemplary embodiment of the invention. The shown hybrid modulator includes a waveguide modulator 350 having two optical outputs 241, which are coupled to twin inputs of a PMOC 500. The waveguide modulator 350 is substantially identical to the modulator 200 of FIG. 12, except that the OSA 140 in the modulator 350 lacks the optional output tap couplers 242 and the output combiner 243, providing instead the modulated outputs from the first and second inner MZIs 216, 217 separately as the twin optical output of the modulator 350. The PMOC 500 includes at its twin inputs, that are respectively coupled to the twin outputs of the modulator 350, the optional tap couplers 242. A polarization rotator 511 rotates the polarization of light from the output of the first inner MZI 216 of the modulator 350. A polarization combiner 512 then incoherently combines the first and second combined lights from the first and second inner MZIs 216, 217 of the modulator 350, which are now orthogonally-polarized, in a low loss fashion to form polarization-multiplexed output light 515, wherein the complimentary $3^{rd}$ order distortions of the modulated outputs of the inner MZIs 216, 217 substantially cancel each other resulting in a linearized modulation of the output light 515. Polarization crosstalk can however degrade the linearization to unacceptable levels if the biasing in the bias section 130 is not optimized.

By way of example, polarization crosstalk of −20 dB may increase the ratio of 2nd and 1st derivatives of the transfer curve at quadrature operating point from zero to 0.24, which limits the suppression of the third order distortions to about 41 dB. By selecting the bias voltages so as to bias the inner MZIs 216, 217 with a common mode DC phase shift of 90 degrees, the creation of 2nd order distortion products may be eliminated. However, 3rd order distortion suppression is reduced to about 29 dB for this worst case condition of polarization crosstalk, which is still adequate for many applications. The phase shift between the inner MZI's is created by introducing a common mode voltage to bias electrodes V1 and V2 relative to V3 and V4. This common mode voltage does not affect the bias point of either inner MZ, however, creates a DC bias shift of one inner MZ relative to the other.

Figure 20:
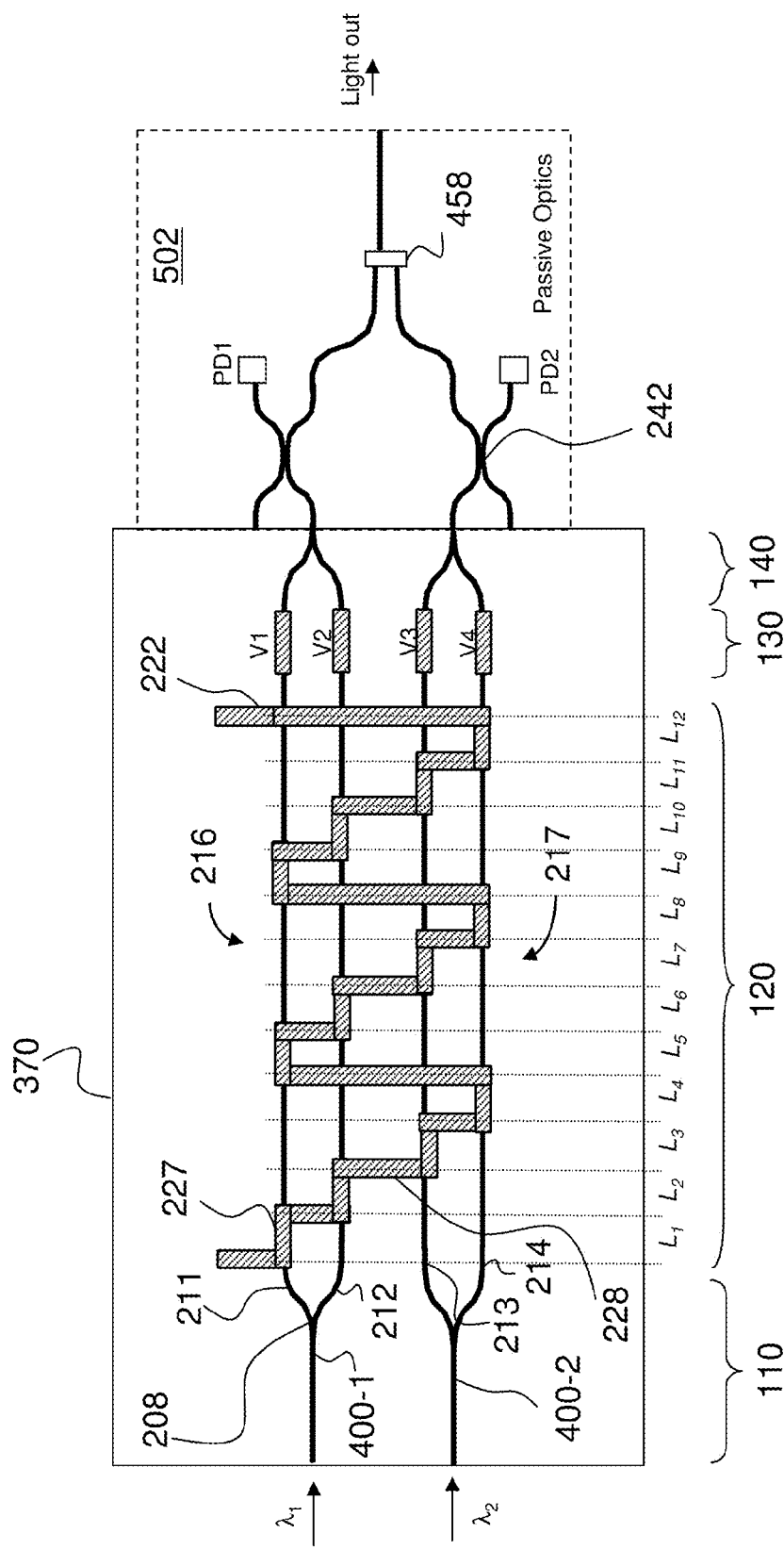
FIG. 20 is a schematic top-view diagram of a hybrid linearized modulator with wavelength multiplexing.

With reference to FIG. 20, there is illustrated an embodiment of the hybrid modulator of FIG. 19 that implements wavelength multiplexing instead of polarization multiplexing. A waveguide modulator 370 may be substantially identical to the modulator 350 in everything except that the OSA 110 in the modulator 370 does not have an input light splitter for splitting light between the two inner MZIs 216 and 217. Instead, the modulator 350 receives input light in the form of two separate light beams at different wavelengths $\lambda_1$ and $\lambda_2$, which are fed into two input waveguides 400-1 and 400-2 coupled to the inner MZIs 216 and 217, respectively, by the beam splitters 208. The wavelengths $\lambda_1$ and $\lambda_2$ are spaced far enough apart such that the coherent beating between the two input beams creates frequency components well above the modulation frequency range of interest. For example, spacing the laser frequencies by a difference frequency much larger than the receiver bandwidth should be sufficient. A PMOC 502 includes a wavelength multiplexer 458 for multiplexing optical outputs from the inner MZIs 216, 217 into a single output light beam 415. In such a design, the same polarization is launched from both inner MZI's 216, 217 into the inputs of the PMOC 502. Two different lasers may be used to form the two input beams at the wavelength $\lambda_1$ and $\lambda_2$, causing the optical mixing in the output light from the PMOC 502 to be essentially incoherent. The advantage of such a design is that the polarization crosstalk does not increase the strength of the 2nd or 3rd order distortion products in the modulation of the output light.

Different applications may require linearity of different modulator characteristics. The exemplary embodiments hereinabove were described primarily with applications in mind that require the dependence of the output optical power P from a modulator ,o be linear with respect to a voltage $V_{RF}$ applied to the RF signal electrode, i.e. having suitably small values of the second and third derivatives of the $P(V_{RF})$ curve in a suitably wide range of voltage values; this enables to suppress 2nd and 3rd order distortion products in the electrical signal produced by a photodetector at the receiver. In the exemplary modulator embodiments described hereinabove, this goal was achieved by selecting a particular value of the coupling coefficient $C_{cplr}$, in dependence on the modulation strength ratio Γ, i.e. by a suitable selection of power and modulation strength asymmetries between two optically parallel MZI structures.

Figure 21:
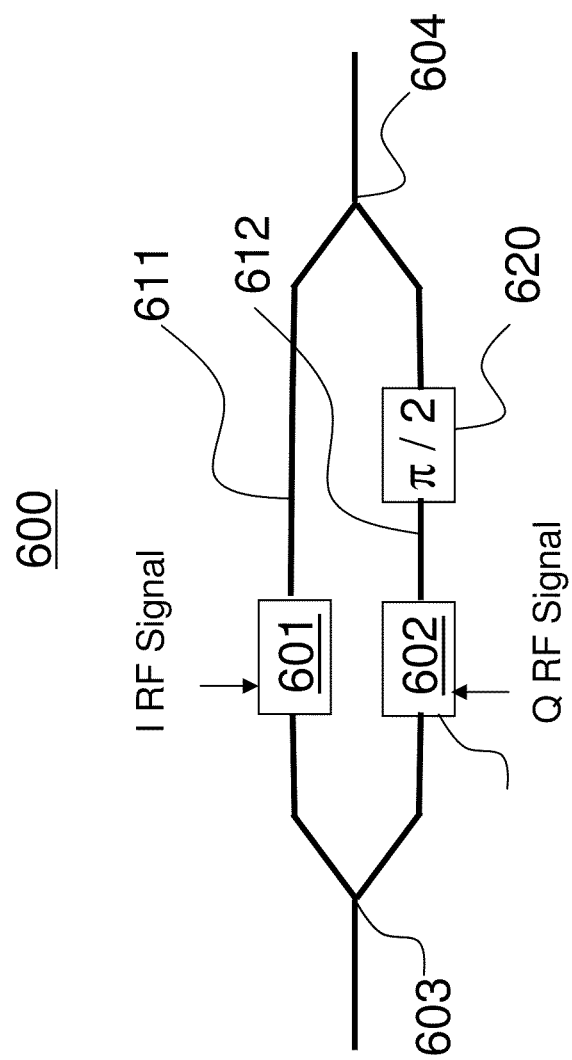
FIG. 21 is a schematic diagram of an IQ modulator for generating QAM optical signals, which incorporates two modulators that are linearized with respect to the optical E-field according to an embodiment of the present invention.

One can also envision modulator embodiments where the relationship between an optical field E of the output optical beam from the modulator and the applied RF voltage is made more linear, which is useful for example for coherent communications applications where an electrical QAM signal is directly applied to the RF electrode, and the magnitude and phase of the optical electric field is detected using a coherent optical receiver. FIG. 21 shows a linearized IQ modulator 600 that maybe used in a coherent communication system using QAM modulation format. The IQ modulator 600 is based on two inner modulators 601 and 602 that are disposed in two different arms 611, 612 of a conventional optical MZI structure with an input optical splitter 603, and an output optical combiner 604. Here, 'I' and 'Q' stand for 'In-phase' [signal] and 'quadrature'[ signal], respectively, according to a standard convention. Thick solid lines designate optical paths that can be in the form of optical waveguides, for example optical fibers. Each of the MZI arms 611, 612 includes a modulator 601, 602. One of the MZI arms, 612, further includes a phase shifter 620.

Figure 1:
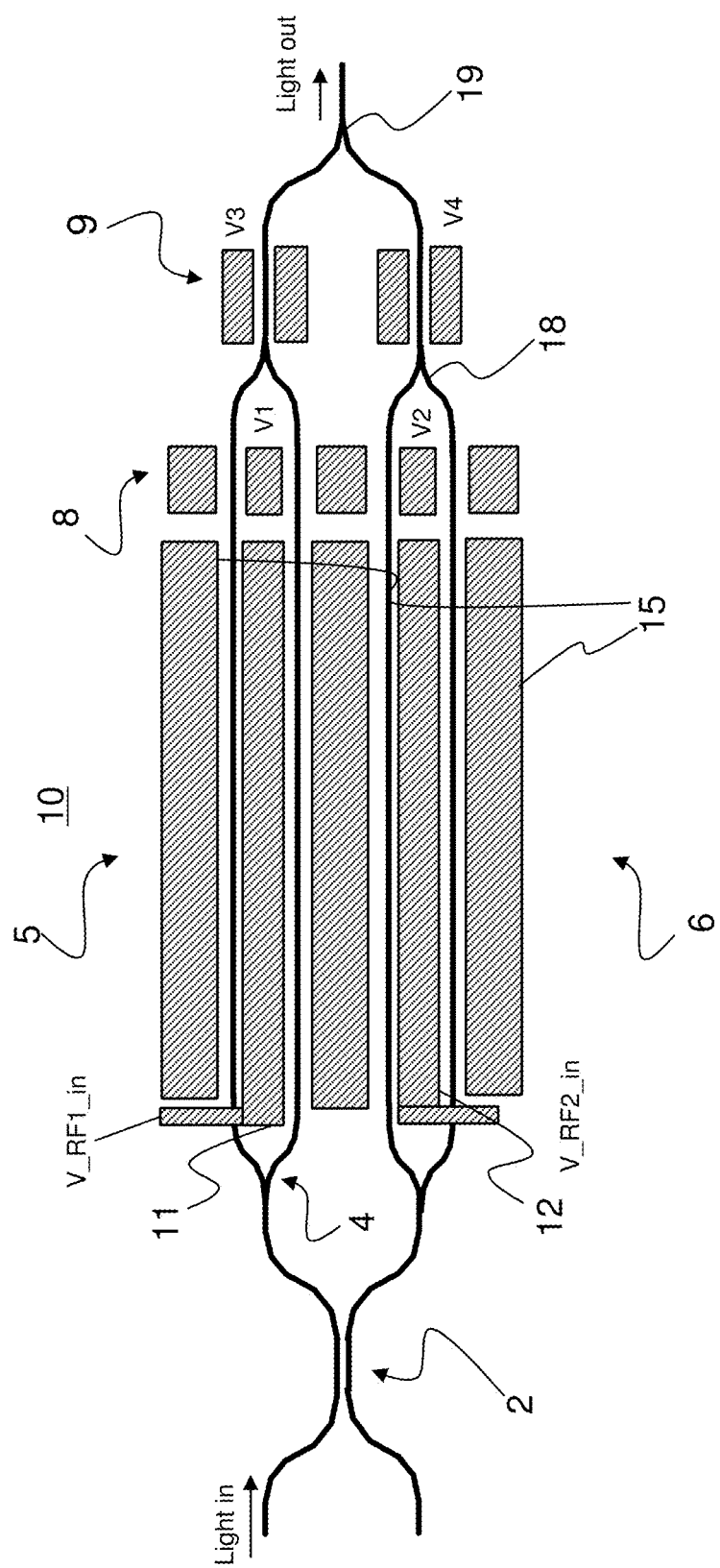
FIG. 1 is a schematic top-view diagram of a prior art X-cut linearized MZ modulator with parallel topology and two signal electrodes.
Figure 2:
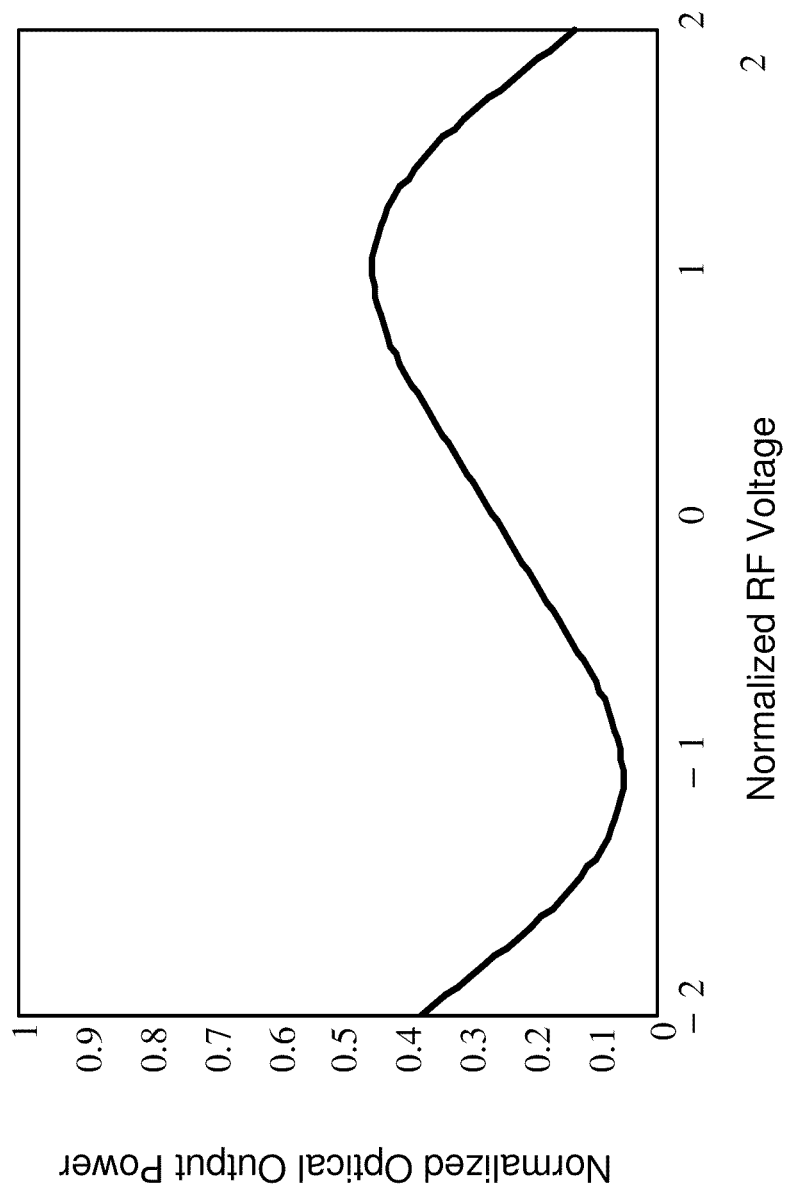
FIG. 2 is a transfer characteristic of the prior art modulator of FIG. 1.
Figure 3:
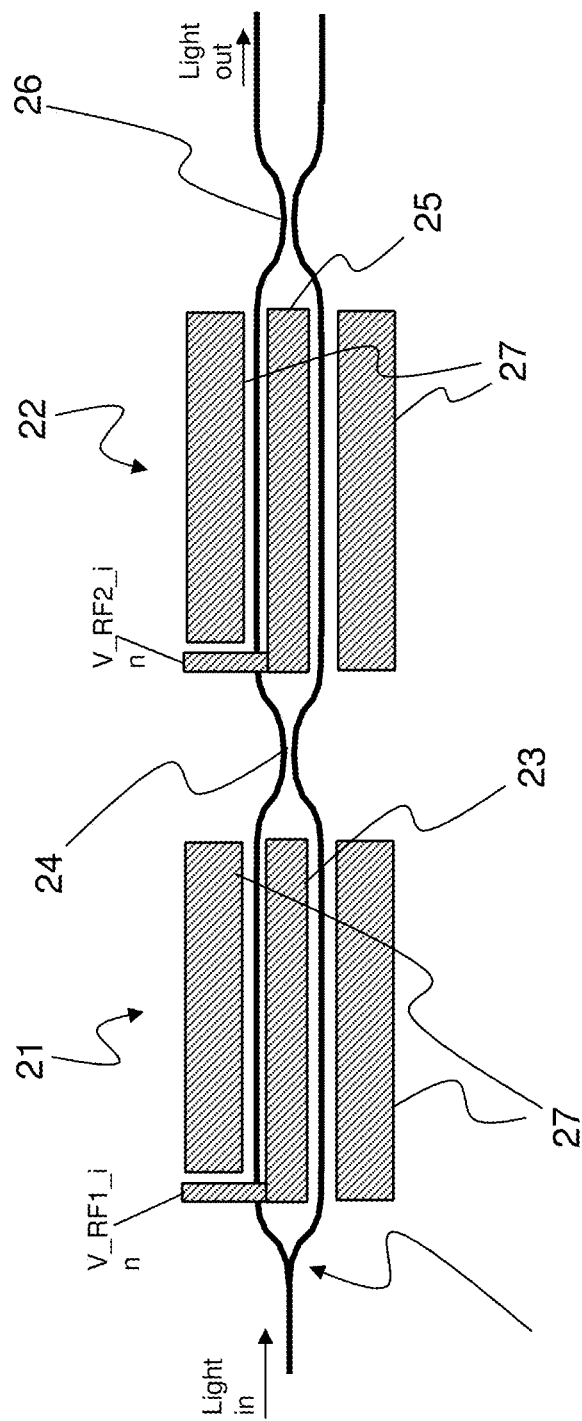
FIG. 3 is a schematic top-view diagram of a prior art X-cut linearized MZ modulator with series topology and two signal electrodes.
Figure 4:
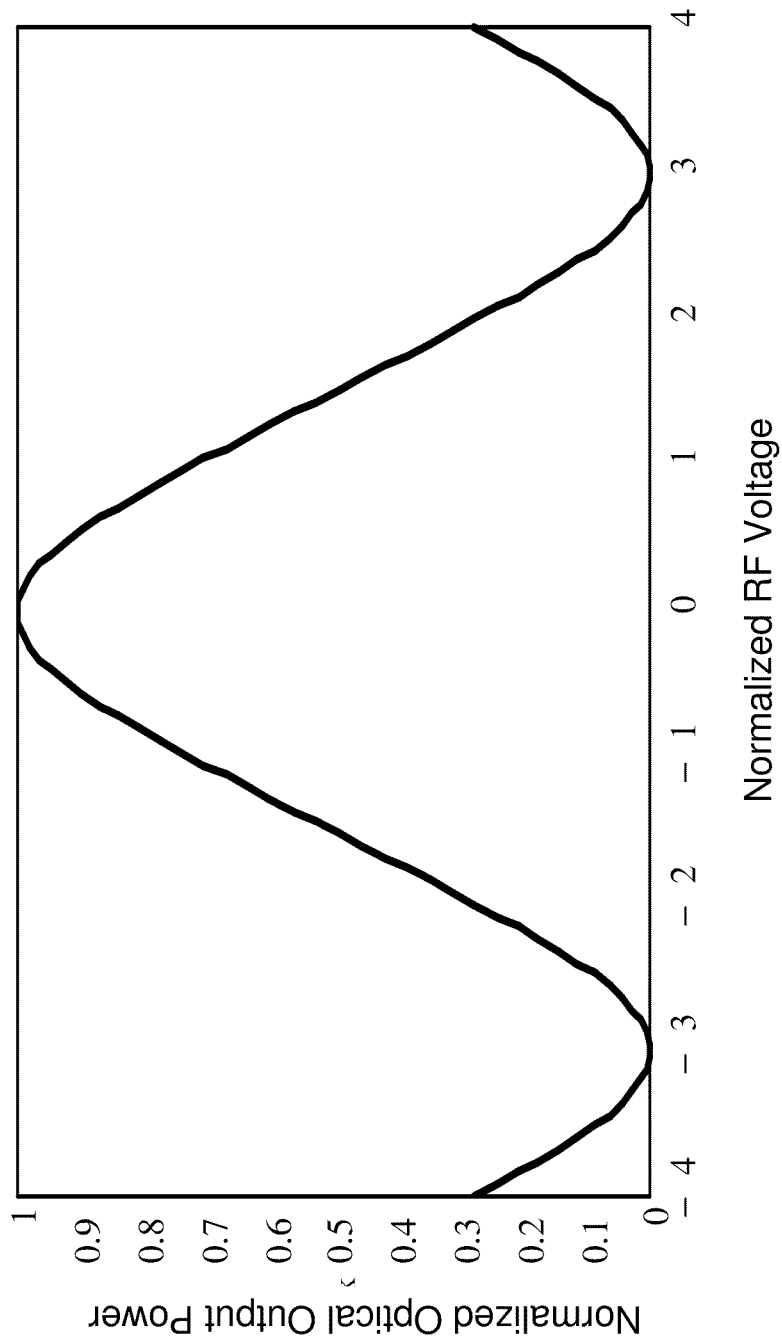
FIG. 4 is a transfer characteristic of the prior art modulator of FIG. 3.

IQ modulators of this type are known in the art, however, they typically utilize conventional MZI modulators as the I and Q modulators 601, 602. The overall structure of the modulator 600 is similar to that shown in FIG. 1, if the input coupler in FIG. 1 is replaced with a balanced Y-junction splitter. I and Q QAM electrical signals arc applied to RF inputs of the modulators 601 and 602, respectively.

In one embodiment of the present invention, each of the I and Q modulators 601, 602 is in the form of a linearized modulator such as described hereinbelow with reference to FIGS. 9, 11, 12, 17-20. For example, by using the modulator structure shown in FIG. 12 with a suitable selection of the sub-section lengths $L_i$, which could be found, for example, using a numerical model for the optical field at the output of the modulator versus applied voltage, and the coupling coefficient $C_{cplr}$ for each of the I and Q modulators 601, 602, the optical E-field vs. applied voltage relationship can be linearized.

Figure 22:
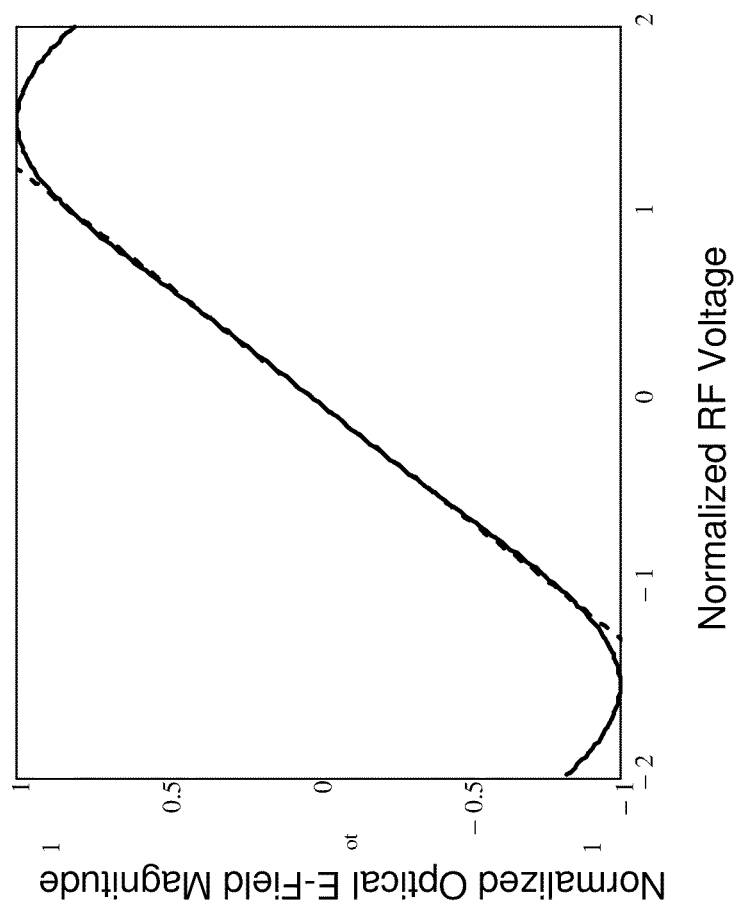
FIG. 22(*a*) is a graph illustrating an E-field transfer curve of a conventional MZ modulator.
Figure 23A:
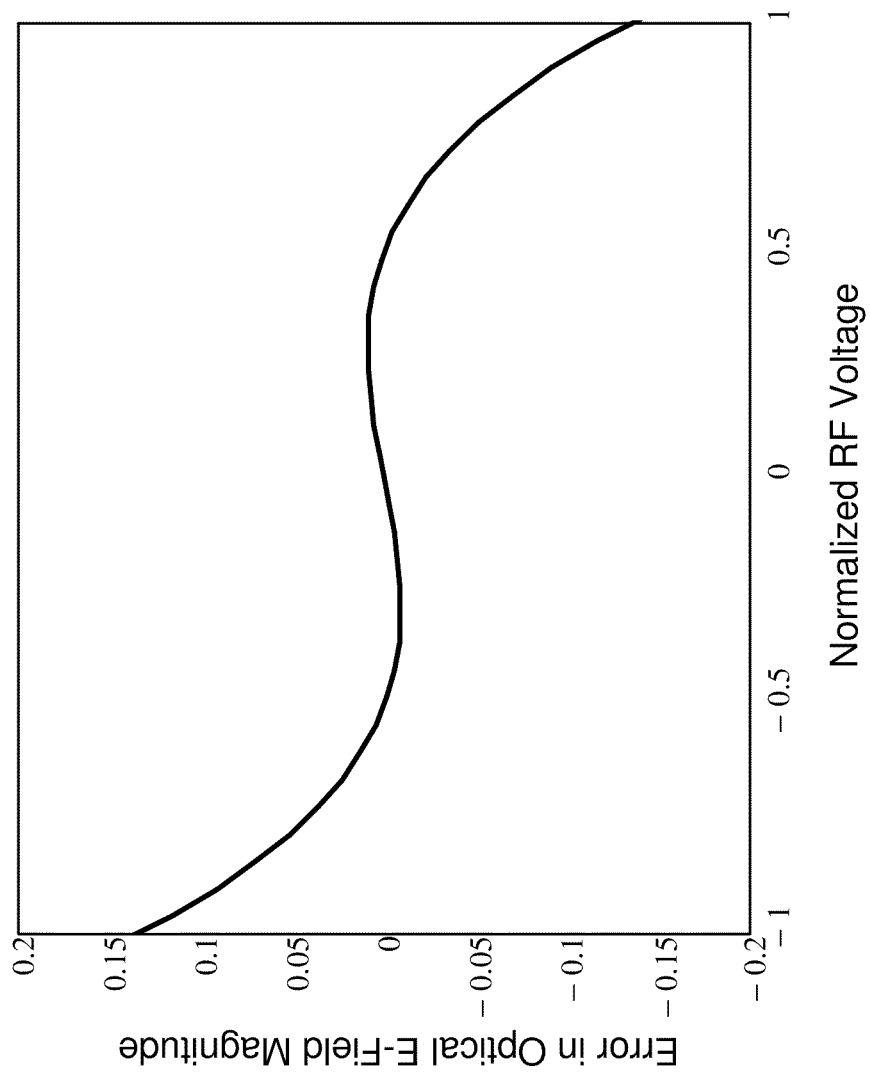
FIG. 23(*a*) is a graph illustrating the difference between the E-field transfer carve of a conventional MZ modulator as shown in FIG. 22(*a*) and a corresponding ideal linear transfer curve.
Figure 23B:
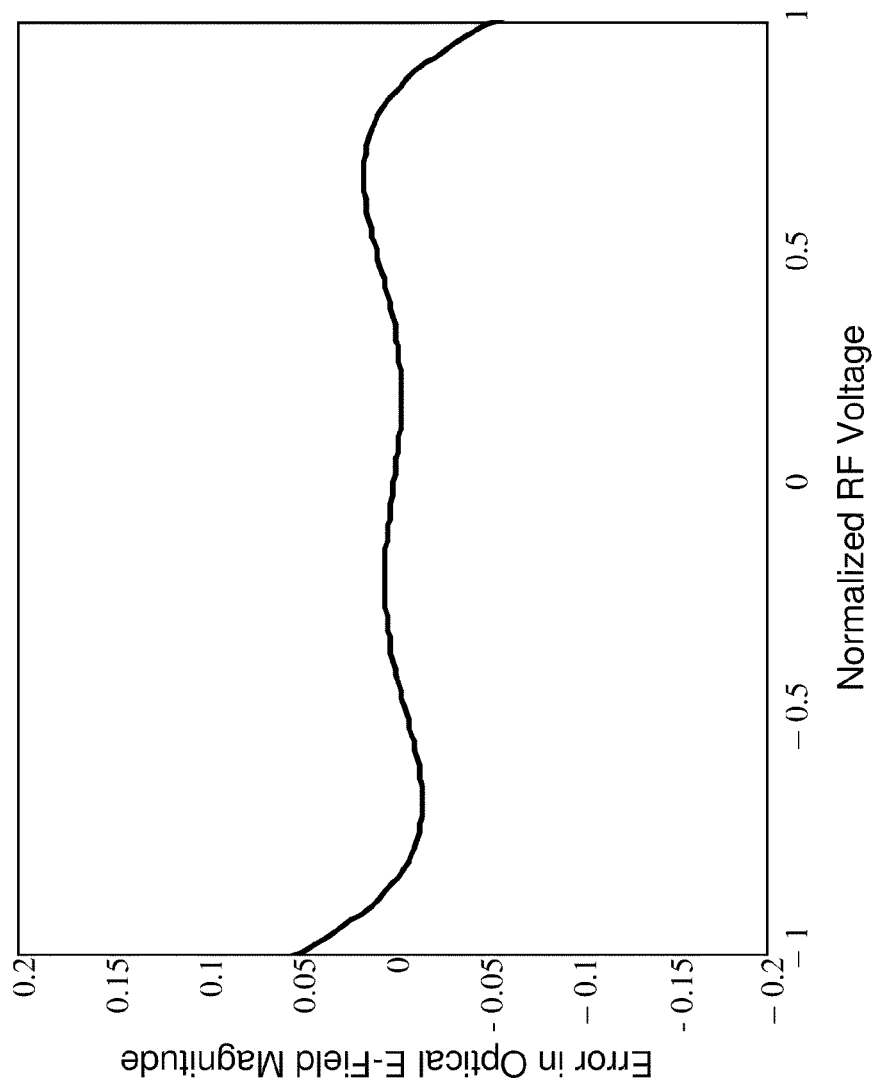

With reference to FIGS. 22(a) and 22(b), there are shown simulated modulator transfer characteristics E(V) representing the dependence of an optical E-filed at the modulator output on the voltage V applied to the RF electrode. The solid line in FIG. 22(a) shows a plot of optical E-field magnitude for a simple conventional MZI modulator wherein two waveguide arms arc modulated by an RF electrode, in comparison to an idealized straight-line response given by a dashed line. The dashed line in that plot is a straight line to compare against. Note that the response becomes substantially non-linear as the normalized optical E-field magnitude exceeds a value of about 0.6. The solid line in FIG. 22(b) shows a plot of optical E-field magnitude for the structure in FIG. 12, where γ and the coupler split ratio have been adjusted to linearize the optical E-field vs. applied voltage instead of optical intensity vs. applied voltage. For this example, γ=−0.3333, and the coupler split ratio equals 0.0048, with most of the light going to the MZI having the weaker modulation. Note that the solid curve tracks the dashed line to larger values of optical E-field magnitude. The difference between the solid and dashed lines, which represents the degree of nonlinearity in the E(V) response, is plotted for the two cases in FIGS. 23(a) and 23(b). FIG. 23(a) corresponds to FIG. 22(a) while FIG. 23(b) corresponds to FIG. 22(b). This difference represents an error in optical E-field magnitude due to the nonlinearity of the E(V) transmission curve. Advantageously, the worst case magnitude of this error is reduced almost by a factor of three for the modulator of FIG. 12 compared to a conventional MZI modulator. One drawback of the linearized E-field designs is that the slope of the optical field vs. RF voltage is reduced, hence these designs will require a higher RF voltage. The penalty of increased drive voltage might be still worth it For QAM applications where optical power and therefore Optical Signal-to-Noise Ratio (OSNR) is limited, the linearization of the IQ output may outweigh disadvantages associated with the increased drive voltage.

There are other combinations of the modulation strength ratio γ and the coupler split ratio $C_{cplr}$ that linearize the optical field magnitude vs. applied voltage relationship, though, in some cases the range of linearity may be reduced. Table 6 lists several combinations that linearize the optical E-field vs. applied voltage. Note that in all cases, most of the light travels through the MZI with the lower modulation strength. Design #2 in that table corresponds to the linearized design referred to in FIGS. 22(h) and 23(b).

TABLE 6

| Design # | γ | Coupler Power Split Ratio |
|---|---|---|
| 1 | −0.2500 | 0.0020 |
| 2 | −0.3333 | 0.0048 |
| 3 | −0.5000 | 0.0450 |
| 4 | −0.7500 | 0.1200 |

Figure 5:
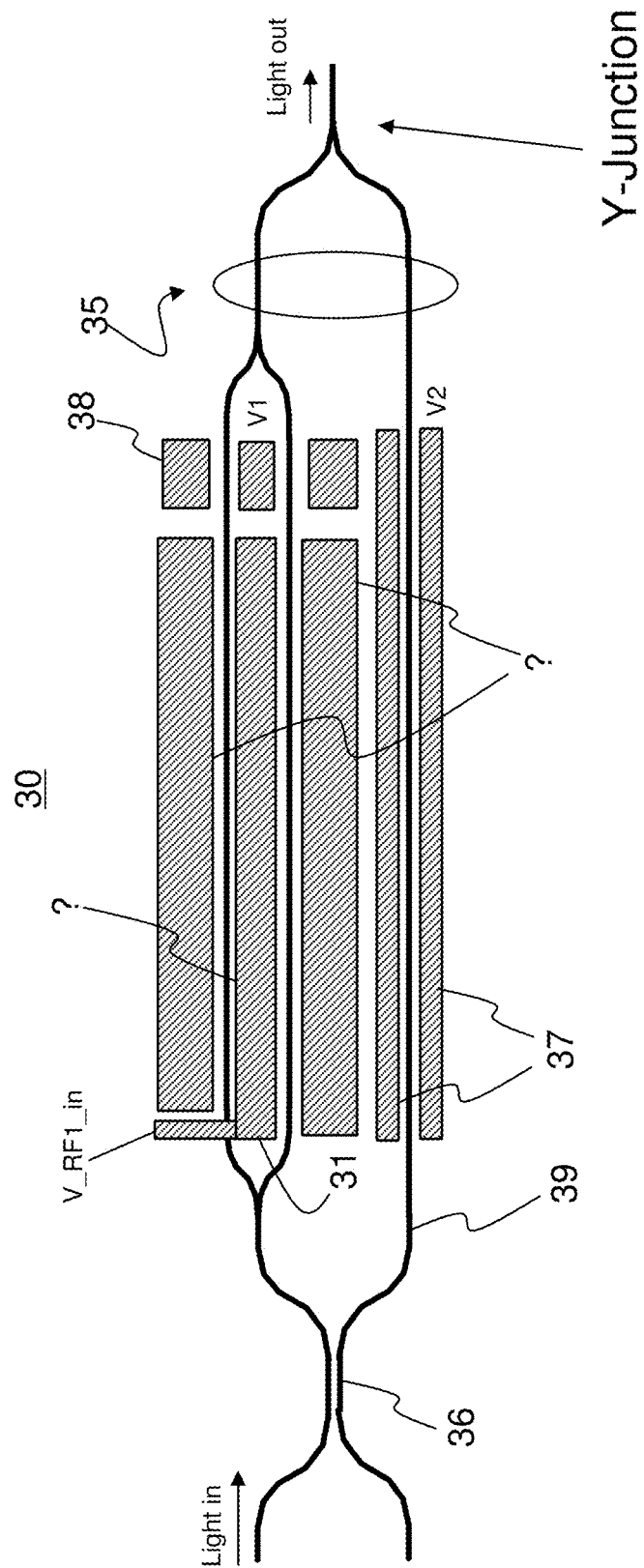
FIG. 5 is a schematic top-view diagram of a prior art X-cut linearized MZ modulator with a nested-MZ topology.
Figure 6:
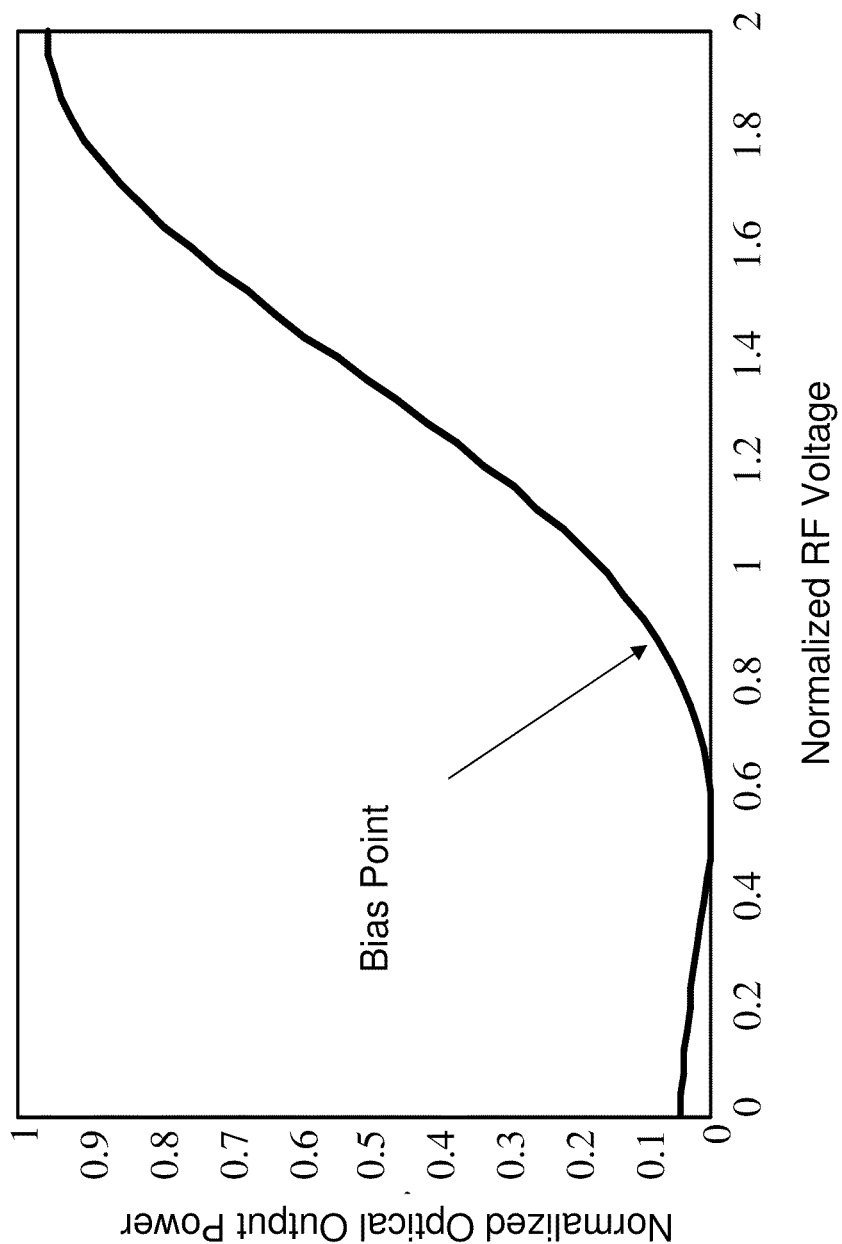
FIG. 6 is a transfer characteristic of the prior art modulator of FIG. 5.
Figure 7:
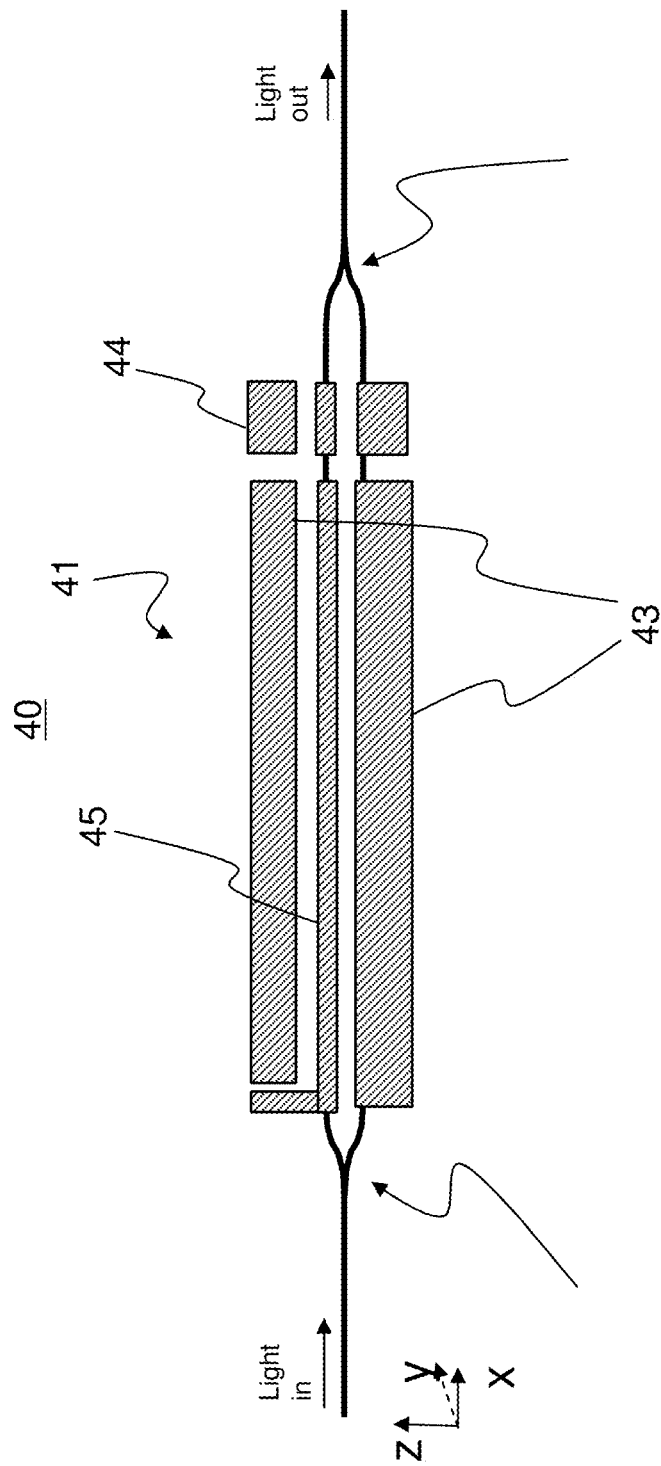
FIG. 7 is a schematic top-view diagram of a prior art Z-cut MZ modulator linearized for specific mixed-polarization light input.
Figure 8:
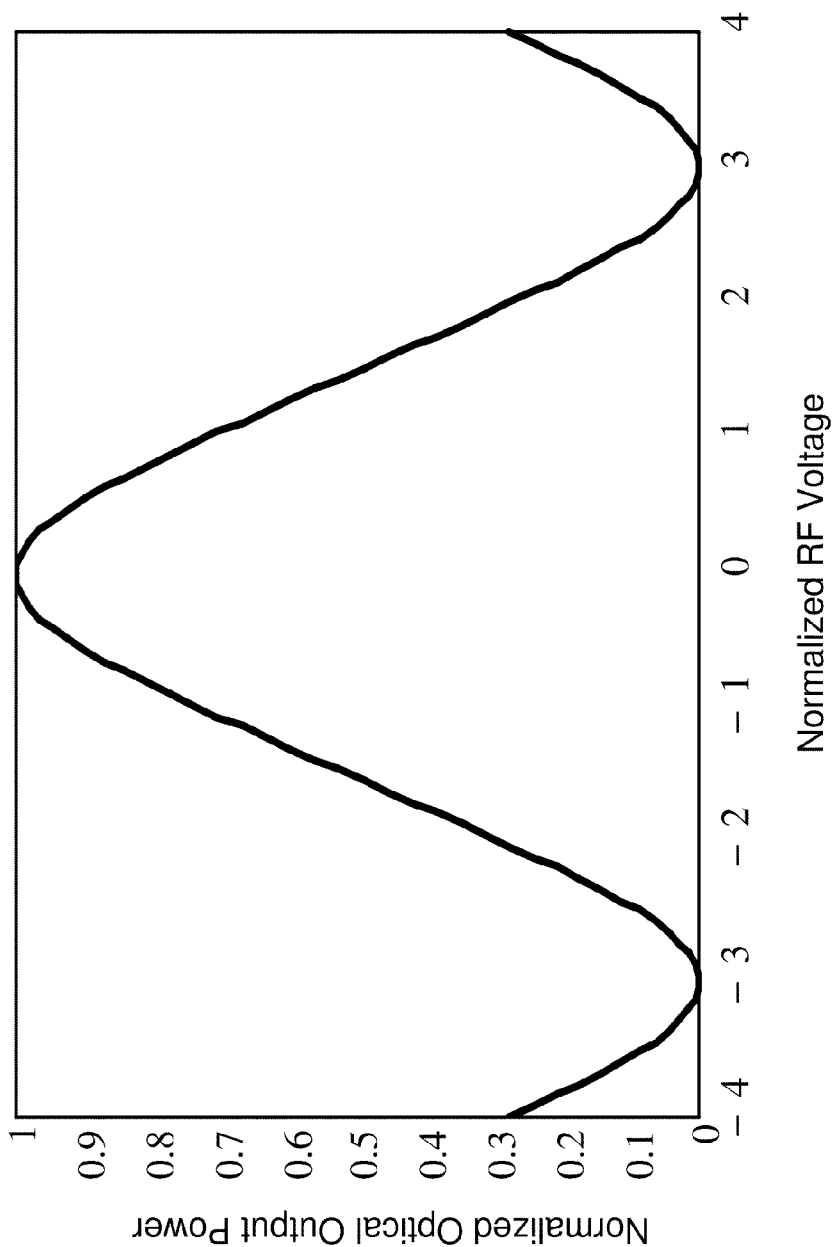
FIG. 8 is a transfer characteristic of the prior art modulator of FIG. 7.
Figure 24:
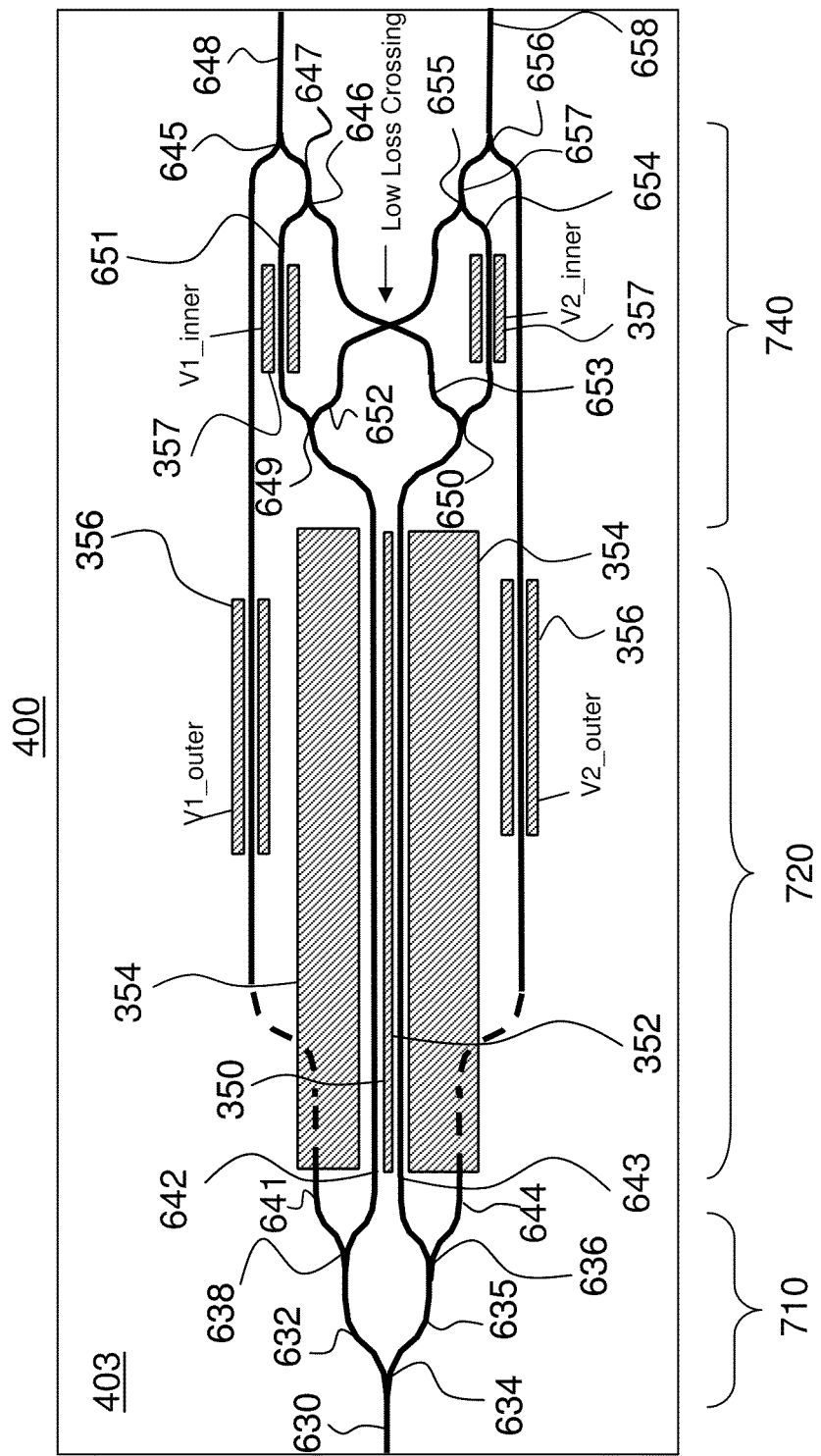
FIG. 24 is a schematic top-view diagram of a linearized dual-output carrier-suppressed waveguide modulator in an X-cut configuration according to an embodiment of the invention.
Figure 25:
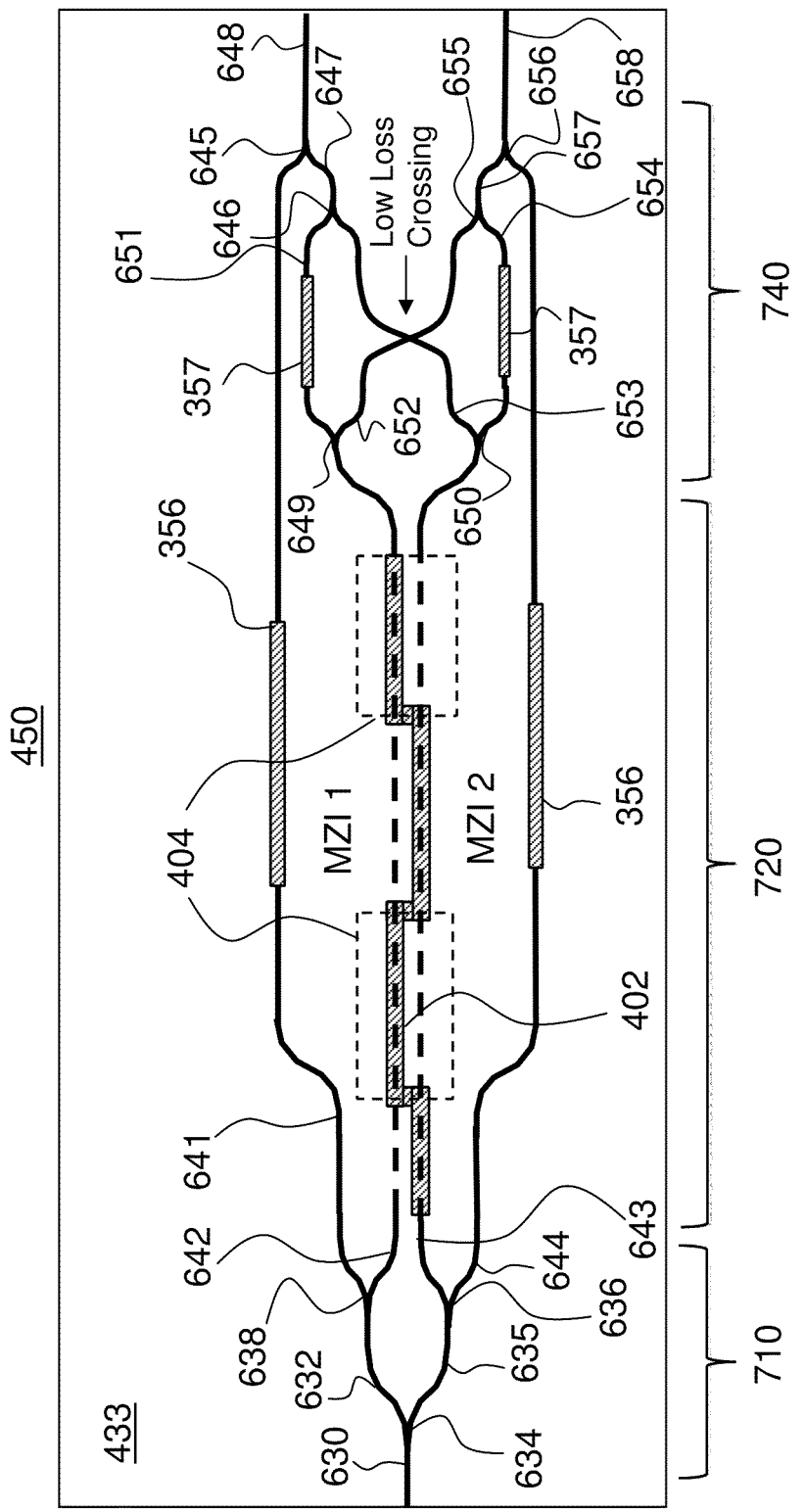
FIG. 25 is a schematic top-view diagram of a linearized dual-output carrier-suppressed waveguide modulator in a Z-cut configuration according to an embodiment of the invention.

With reference to FIGS. 24 and 25, there are illustrated modulators 400 and 450 in accordance with another embodiment of the present invention. The modulators 400 and 450 are dual output carrier suppressed modulators with electrode arrangements for inducing electrical field within the waveguide that is generally normal to the substrate and in-plane with the substrate, respectively, for example, as used for z-cut and x-cut LN. For the sake of clarity, the ground electrodes are not shown in Fig. 25. Note the conventional carrier-suppressed modulator shown in FIG. 5 outputs light wherein neither RIN from the laser source, nor CSO are suppressed. The modulators 400 and 450 enable to suppress RIN and CSO if their output ports 648, 658 are coupled into two photo-diodes wired for differential detection, for example using two optical fibers or a suitable PLC.

The exemplary modulators 400 and 450 have substantially identical waveguide topologies, but different electrode positioning due to the different substrate orientations. Exact shape and positioning of various waveguide elements may vary depending on implementation. In both modulators 400 and 450, input light is received in an optical input port 630 in the form of an input optical waveguide. First and second output ports 648, 658 in the form of two output waveguides output first and second output light from the respective modulator. An OSA 710, which is formed by a cascade of an optical splitters 634 followed by two parallel optical splitters 636, 638, e.g. in the form of three waveguide Y-junctions, is optically coupled to the input port 630 for splitting the input light into four light portions. In one embodiment, all of the optical splitters have a splitting ratio 0.5, so that the four light portions are equal in power. An OCA 740 is spaced apart from the OSA 710 defining a modulation section 720 therebetween. The OCA 740 is optically coupled at its output to the first and second output ports 648, 658 forming the first and second output light from the four light portions. First 641, second 642, third 643 and fourth 644 optical waveguides are formed in the substrate 403 or 433 and extend optically in parallel between the OSA 710 and the OCA 740 for guiding the four portions of light therebetween traversing the modulation section 720, with the inner second and third waveguides 642 and 643 positioned in a space between the outer first and fourth waveguides 641 and 644.

Each of the modulators 400 and 450 has a single RE signal electrode 352 or 402, and one or more ground electrodes 354 that are illustrated in FIG. 24 but not shown in FIG. 25 for the sake of clarity. In each modulator, the respective RF electrode is disposed in the modulation section 720 so as to induce an RF electrical field in each of the second 642 and third 643 inner waveguides when the RF electrode is connected to a source of RF electrical signal. The ground electrodes are disposed so as to shield the outer waveguides from the RF signal electrodes.

The OSA 740 is in the form of a waveguide optical beam combiner network, which combines light from the first, second, and third waveguides 641, 642 and 643 into the first combined light coupled into the first output port 648, combines light from the second, third and fourth waveguides 642, 643 and 644 into the second combined light coupled into the second output port 658. Light from each of the second and third waveguides 642, 643 is equally split using optical splitters 649, 650 between the first 648 and second 658 output ports. The Y-junction combiners 652, 650, 646 and 655 are optically connected so as to form a 2×2 optical coupler including two optical phase shifters 357 in its straight paths.

Phase adjusting means in the form of a plurality of bias electrodes 356 and 357 are further provided for adjusting optical phases of light propagating in the first and forth waveguides 641 and 664, for adjusting an optical phase of light coupled from the second waveguide 642 into the first output port 648, and for adjusting an optical phase of light coupled from the third waveguide 643 into the second output port 658. Other means for adjusting the respective optical phases can also be used in place of the bias electrodes in other embodiments; examples of such means include the deposition and trimming of a cladding layer on top of the waveguide. By suitably selecting bias voltages applied to the bias electrodes 356 and 357, third order modulation distortions in each of the first and second combined light can be suppressed, resulting in a push-pull modulation of each of the first and second output light.

The operation of the modulators 400 and 450 can be described as follows. Each of the two inner waveguides 642, 643 closest to the RF signal electrode 352 or 402 is an arm of one of two inner MZI's, labeled in FIG. A24 as 'MZI 1' and 'MZI 2', with another arm being the closest of the outer waveguides 641, 644. Each of the inner MZI's is independently biased and independently coupled at outputs with another inner waveguide 653 or 652, forming a larger MZI. This design allows for independent bias control of the two inner MZI's MZI 1 and MZI 2. One of the inner MZI's is biased such that the transfer curve has a positive slope at a point where 3rd order intermodulation products arc suppressed. The other inner MZI is biased such that the transfer curve has a negative slope at a point where 3rd order intermodulation products are suppressed. The 2nd derivative has the same sign for either transfer curve, even though the first derivatives have opposite sign. Hence, cancellation of both RIN and CSO components occurs at the balanced receiver. Note that the chirp parameter for the inner MZI's should both he set to zero by a suitable selection of bias voltages.

Referring to FIG. 25, the modulator 400 may be fabricated in the Z-cut LN substrate 433. The single RF electrode 402 meanders from one of inner waveguides 642, 643 to the other, modulating the waveguide closest thereto along the length of the electrode segments disposed over the waveguides. Ground electrodes are not shown; they are spaced apart from the RF signal electrode 402 by a fixed gap and meander alongside the RF electrode, generally as illustrated in FIG. 13. The chirp of each of the inner MZI's 'MZI 1' and 'MZI 2' is made zero by the use of suitably spaced inverse domain regions 404 forming an alternating domain structure in the modulation sections, and the use of the meandering RF electrode 402, which segments arc alternatingly positioned over each of the two inner waveguides 642, 643 and correspond in length to respective domain inverted regions 404 or spacings therebetween. The four-segment design of the electrode 402 is described in JDSU patent application 2009/0093982 which is incorporated herein by reference.

Figure 26:
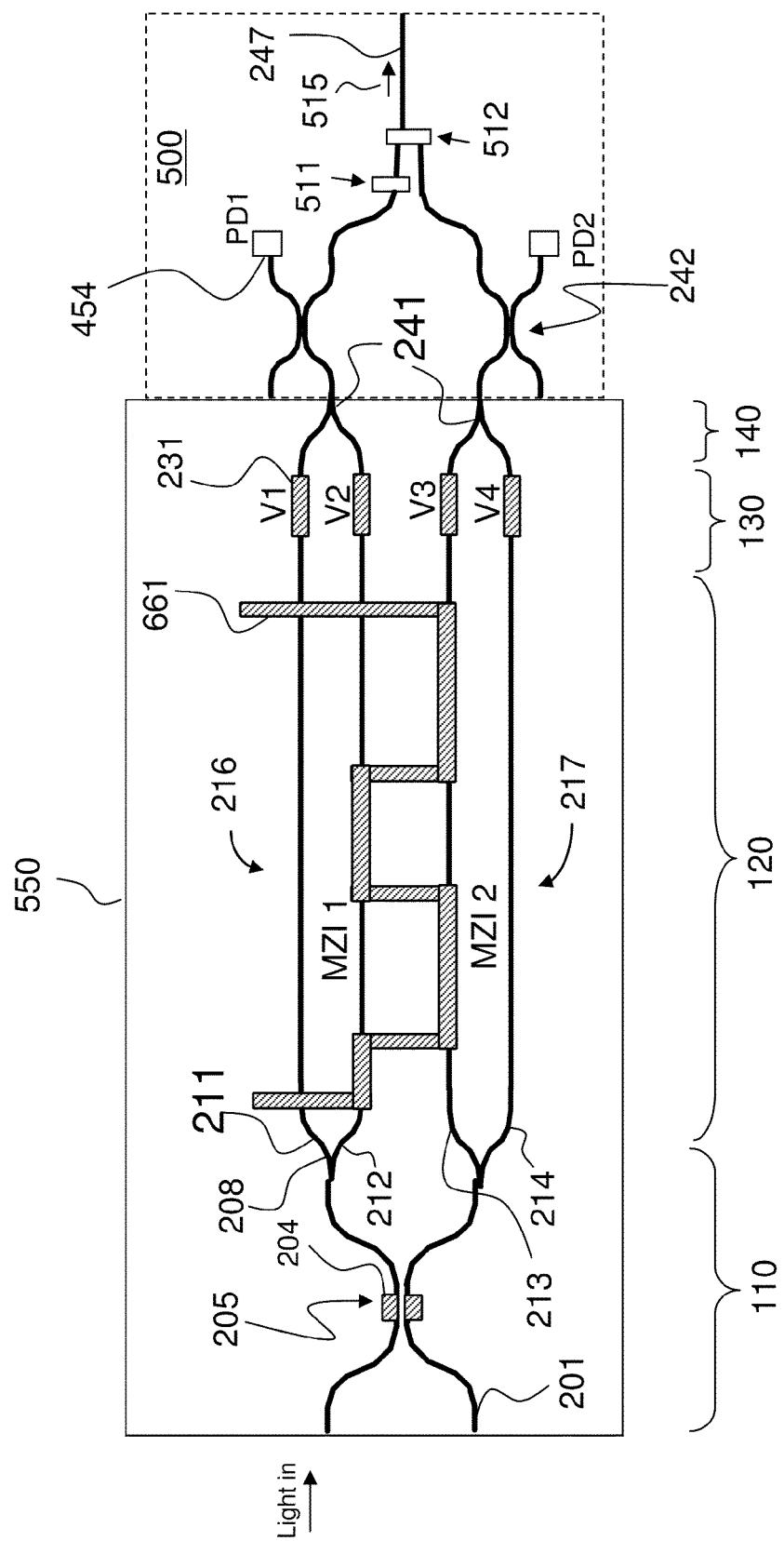
FIG. 26 is a schematic top-view diagram of a linearized waveguide modulator wherein a single four-segment RF electrode modulates four optical waveguides according to an embodiment of the invention.

With reference to FIG. 26, there is illustrated a hybrid optical modulator 550 according to another embodiment of the present invention utilizing polarization multiplexing. Similarly to the hybrid optical modulator of FIG. 19, the hybrid optical of FIG. 26 includes a waveguide modulator 550 having two optical outputs, which arc coupled to twin inputs of the PMOC 500. The waveguide modulator 550 may be substantially identical in structure to the waveguide modulator 350 of FIG. 19, except that its RF signal electrode 661 has a four-segment design and is disposed to modulate only the two inner waveguides 212, 213, with ground electrodes (not shown) substantially shielding the outer waveguides 211, 214 from the RF electrical filed of the RF electrode 661 when a voltage is applied thereto. The ground electrodes are spaced apart from the signal electrode by a fixed gap, hence the ground electrodes must meander just as the signal electrode does. The two inner waveguides 212, 213 are modulated in counter-phase, i.e with a 180° modulation phase shift therebetween.

The waveguide modulator 550 has two inner MZI's 216 and 217, which are also labeled in the figure as 'MZI 1' and 'MZI 2', that share the single RF electrode, 661 but have separate waveguide portions which allow independent bias control. Note that ground electrodes are not shown. The design of the four-segment RF electrode is similar to that in FIG. 25, however, the modulation strength ratio between the two inner waveguides is less than one, and for example is γ=0.333 for this case. In addition, domain inversion regions are absent. The polarization state for the light output from the inner MZI 1 is rotated 90 degrees by the polarization rotator 511 of the PMOC 500, while the polarization of the light output from the other inner MZI 2 is not rotated. The polarization combiner 512 combines the output of the inner MZIs 216, 217 by means of polarization multiplexing as known in the art. Optional couplers 242 tap a portion of the combined light exiting each MZI 216, 217, allowing for independent monitoring. The voltage tunable coupler 295 at the input of the modulator 550 allows for careful control of the power split ratio between the two inner MZI's 216, 217. By way of example, the inner MZI 2 that receives $\Gamma=1/\gamma$ times stronger modulation due to having longer segments of the RF electrode 661 disposed over it, only gets about 3.6% of the total optical power that the voltage tunable coupler 205 outputs from both inputs. The PMOC 500, that includes the polarization rotator 511, polarization combiner 512, optional tap couplers 242, and photodiodes 'PD1' and 'PD2, can he formed with free-space optics or integrated into a Photonic Light Circuit (PLC), which uses optical waveguides on a separate substrate.

A polarization crosstalk occurring within the PMOC 500, in an optical fiber downstream from the light source or at the receiver may cause coherent interference between the two light outputs of the waveguide modulator 550, degrading the suppression of 2nd and 3rd order distortion terms in the output modulation signal from the receiver. This degradation is exasperated by the fact that the light exiting each inner MZ is chirped, due to the asymmetry in modulation depth between waveguides under the hot electrode and those under either ground electrodes. The chirped light causes severe distortion of the transfer curve for polarization crosstalk of −20 dB. Polarizing Annealed Proton Exchanged (APE) waveguide can be stitched in near the optical input(s) and output(s) of a device made primarily of Ti-indiffused waveguides, so as to remove the unwanted polarization to reduce or eliminate the polarization crosstalk.

In the context of this specification, the term "combining four light portions" may mean combining the portions in different combinations, and encompasses combining all four light portions into a single combined light beam, pairwise combining when two of the four light portions are combined in a first combined light, and the other two light portions are combined in the second combined light, and other types of combining when output light includes combined light from at least two of the portions. The term "arrangement" is used herein to mean a structure or a device, and may comprise one or more waveguide elements configured to have the specified functionality.

While illustrative embodiments of the invention have been described above, it is, of course, understood that various modifications of these embodiments are possible and will be apparent to those of ordinary skill in the art. Such modifications are within the spirit and scope of the invention, which is limited and defined only by the appended claims. It should also be understood that each of the preceding embodiments of the present invention may utilize a portion of another embodiment. An ordinary person in the art would be able to construct such embodiments without undue experimentation in light of the present disclosure.

For example, although the approaches described hereinabove were described with reference to linearized modulators, other the linearization is not performed are also possible and are within the scope of the present invention. Such embodiments may include modulating three or more waveguides using a single RF electrode with a modulation depth for each of the waveguides that tracks over a wide frequency range, where the modulation depths are equal at any given frequency, or related to one another by a fixed ratio. The waveguides could be part of inner MZI's needed for the creation of intensity modulation, or simply part of phase modulators. The waveguides could he modulated in parallel as described here, but connected optically in series. One skilled in the art can apply the methods described herein to those designs. Furthermore, although the embodiments described hereinabove were described with reference to lithium niobate substrates, other materials used to create waveguide modulators such as InP, GaAs, silicon, or polymers could be used, as well. Those skilled in the art will know whether to use electrode designs suitable for z-cut LN or x-cut LN in such materials.

Of course numerous other embodiments may be envisioned without departing from the spirit and scope of the invention.

We claim:

1. A waveguide modulator, comprising:
   a substrate comprising electro-optical material that is responsive to a vertical electrical field normal to the substrate;
   an optical splitting arrangement (OSA) formed in the substrate for splitting input light into four light portions;
   an optical combining arrangement (OCA) formed in the substrate for combining a first two of the four light portions into first combined light and a second two of the four light portions into second combined light, wherein the OSA is spaced apart from the OCA for defining therebetween a first modulation section;
   four optical waveguides formed in the substrate and extending optically in parallel between the OSA and the OCA traversing the modulation section for separately guiding the four light portions from the OSA to the OCA;
   wherein two of the four optical waveguides comprise at least one domain inverted waveguide portion each and the other two of the four optical waveguides comprise at least one non-inverted waveguide portion each, wherein said domain inverted waveguide portions have an electro-optic domain structure that is inverted relative to an electro-optic domain structure of the non-inverted waveguide portions in the absence of external electrical field; and,
   an RF signal electrode and two ground electrodes disposed upon the substrate in the first modulation section in the absence of other signal electrodes therein, wherein the RF signal electrode and the two ground electrodes are disposed for inducing an RF electrical field in the domain inverted portions of the two of the four optical waveguides and for inducing an RF electrical field in the non-inverted portions of the other two of the four optical waveguides so as to effect counter-phase modulation of the first and second combined light, whereby third-order modulation distortions in the first and second combined light have opposite signs for at least partially compensating each other, when the RF signal electrode is connected to a source of RF electrical signal.

2. The waveguide modulator of claim 1, wherein at least one of the OSA and the OCA comprises one or more optically asymmetric couplers that direct a greater portion of the input light into the second combined light than into the first combined light so that the second combined light is greater in power than the first combined light at an output of the OCA, and wherein the RF signal electrode is positioned so as to modulate the second two light portions with a greater modulation strength than the first two light portions when an RF voltage is applied thereto, so that at the output of the OCA the first combined light is modulated stronger than the second combined light.

3. The waveguide modulator of claim 2, wherein the third-order distortions in each of the first and second combined light relate to a $3^{rd}$ order nonlinearity of a dependence of optical power in the respective first or second combined light on a voltage applied to the RF signal electrode.

4. The waveguide modulator of claim 2, wherein the third-order distortions in each of the first and second combined light relate to a $3^{rd}$ order nonlinearity of a dependence of an optical field in the respective first or second combined light on a voltage applied to the RF signal electrode.

5. The waveguide modulator of claim 2, wherein the one or more optically asymmetric couplers have a coupling ratio $R_{cplr}$ that is selected in dependence upon a modulation strength ratio $\gamma$ of the first combined light and the second combined light so that third-order modulation distortions in the first and second combined light are of a substantially same magnitude for mutually compensating each other when the first and second combined lights are combined into a single output light beam.

6. The waveguide modulator of claim 5, wherein:
   the four waveguides are formed of two outer waveguides for guiding the first two light portions and two inner waveguides for guiding the second two light portions, wherein the two inner waveguides are positioned between the two outer waveguides,
   wherein the two ground electrodes are disposed at each of the outer waveguides extending outwardly therefrom in the absence of a ground electrode between the outer waveguides in the first modulation section,
   wherein the RF signal electrode traverses the first modulation section over the two inner waveguides and apart from the two outer waveguides for inducing a stronger modulation in the two inner waveguides than in the two outer waveguides,
   wherein the waveguide modulator comprises an output waveguide and wherein the OCA is coupled thereto for coupling light from the two inner optical waveguides and the two outer optical waveguides into the output waveguide, and wherein the one or more optically asymmetric couplers are configured for coupling more light into the output waveguide from the outer waveguides than from the inner waveguides.

7. The waveguide modulator of claim 6, wherein:
   the substrate in the first modulation section comprises a domain inversion region extending laterally from one of the inner waveguides to a closest one of the outer waveguides, said domain inversion region forming the domain inverted waveguide portions of said inner and outer waveguides,
   wherein the domain inversion region has an electro-optic domain structure that is inverted relative to a domain structure of a region of the substrate that extends laterally from a second of the inner waveguides to a second of the outer waveguides and includes said second inner and outer waveguides, so as to effect the first push-pull modulation of the outer waveguides, and the second push-pull modulation of the inner waveguides.

8. The waveguide modulator of claim 6, wherein the modulation strength ratio $\gamma$ relates to the coupling ratio $R_{cplr}$ according to a following equation:

$$R_{cplr} = \frac{1}{2}\left[1 - \frac{R^3 + 3R}{3R^2 + 2}\right]$$

wherein $$R = \frac{1 - |\gamma|}{1 + |\gamma|}$$

and wherein $|\gamma|<1$.

9. The waveguide modulator of claim 6, wherein the OCA comprises two optically asymmetric couplers optically connected in parallel to the four optical waveguides, and an optical combiner disposed for coupling output light from each of the two optically asymmetric couplers into the output waveguide, wherein each of the two optically asymmetric couplers is disposed for combining light from one of the inner waveguides and one of the outer waveguides so as to couple into the output waveguide more light from the inner optical waveguide than from the outer optical waveguide.

10. The waveguide modulator of claim 6, wherein the OSA comprises two optically asymmetric couplers, each of which disposed for splitting a portion of the input light between one of the inner waveguides and one of the outer waveguides so as to couple more light into the outer waveguides than into the inner optical waveguides.

11. The waveguide modulator of claim 1, wherein:
the OSA comprises first and second parallel waveguide splitters;
the OCA comprises first and second parallel waveguide combiners;
a first two of the four waveguides are optically coupled between the first waveguide splitter and the first waveguide combiner for forming a first Mach Zehnder interferometer (MZI) structure (MZIS); and,
a second two of the four waveguides are optically coupled between the second waveguide splitter and the second waveguide combiner for forming a second MZIS.

12. The waveguide modulator of claim 1, comprising a single input waveguide for directing the input light to the OSA.

13. The waveguide modulator of claim 12, comprising two output waveguides for outputting the first and second combined light.

14. The waveguide modulator of claim 1, further comprising phase adjusting means for adjusting relative optical phases of the four light portions so as to effect a $\pi/2$ optical phase shift between the first two of the four light portions and $-\pi/2$ between the second two of the four light portions, and to effect a $\pi/2$ optical phase shift between the first and the second combined light.

* * * * *